(12) United States Patent
Corral et al.

(10) Patent No.: US 9,452,568 B2
(45) Date of Patent: Sep. 27, 2016

(54) VARTM FLOW MODIFICATIONS FOR LOW VISCOSITY RESIN SYSTEMS

(75) Inventors: Sergio Corral, Conroe, TX (US); Stephen Crane, Camano Island, WA (US); Anthony R. Stephen, South Pasadena, CA (US); Christopher J. Cruce, Poway, CA (US); Everardo Garcia Flores, San Diego, CA (US)

(73) Assignee: MATERIA, INC., Pasadena, CA (US)

( * ) Notice: Subject to any disclaimer, the term of this patent is extended or adjusted under 35 U.S.C. 154(b) by 696 days.

(21) Appl. No.: 13/818,271

(22) PCT Filed: Aug. 23, 2011

(86) PCT No.: PCT/US2011/001488
§ 371 (c)(1),
(2), (4) Date: Oct. 9, 2013

(87) PCT Pub. No.: WO2012/026980
PCT Pub. Date: Mar. 1, 2012

(65) Prior Publication Data
US 2014/0147688 A1   May 29, 2014

Related U.S. Application Data

(60) Provisional application No. 61/376,253, filed on Aug. 23, 2010, provisional application No. 61/497,880, filed on Jun. 16, 2011.

(51) Int. Cl.
  *B29C 70/44* (2006.01)
  *B29C 70/02* (2006.01)
  *B29C 70/54* (2006.01)

(52) U.S. Cl.
  CPC .......... *B29C 70/021* (2013.01); *B29C 70/443* (2013.01); *B29C 70/546* (2013.01); *Y10T 428/31924* (2015.04)

(58) Field of Classification Search
  CPC .. B29C 70/021; B29C 70/443; B29C 70/546
  See application file for complete search history.

(56) References Cited

U.S. PATENT DOCUMENTS

| | | | |
|---|---|---|---|
| 4,708,969 A | 11/1987 | Leach | |
| 4,902,215 A * | 2/1990 | Seemann, III | 425/406 |
| 5,312,940 A | 5/1994 | Grubbs et al. | |
| 5,342,909 A | 8/1994 | Grubbs et al. | |
| 5,840,238 A | 11/1998 | Setiabudi et al. | |
| 5,939,504 A | 8/1999 | Woodson et al. | |
| 5,977,393 A | 11/1999 | Grubbs et al. | |
| 6,310,121 B1 * | 10/2001 | Woodson, Jr. | C08G 61/08 502/152 |
| 6,525,125 B1 | 2/2003 | Giardello et al. | |
| 6,552,139 B1 | 4/2003 | Herrmann et al. | |
| 6,565,792 B2 | 5/2003 | Hemphill | |
| 6,607,997 B1 * | 8/2003 | Cox | B29C 44/12 428/304.4 |
| 6,613,910 B2 | 9/2003 | Grubbs et al. | |
| 6,620,955 B1 | 9/2003 | Pederson et al. | |
| 6,635,768 B1 | 10/2003 | Herrmann et al. | |
| 6,787,620 B2 | 9/2004 | Herrmann et al. | |
| 6,818,159 B2 * | 11/2004 | Hinz | B29C 70/443 264/102 |
| 6,838,489 B2 | 1/2005 | Bell et al. | |
| 6,843,953 B2 | 1/2005 | Filsinger et al. | |
| 6,919,039 B2 | 7/2005 | Lang et al. | |
| 6,921,735 B2 | 7/2005 | Hoveyda et al. | |
| 7,026,495 B1 | 4/2006 | Pederson et al. | |
| 7,147,818 B1 | 12/2006 | Rigas et al. | |
| 7,255,549 B2 * | 8/2007 | Hadley | B29C 35/0266 264/328.12 |
| 7,294,717 B2 | 11/2007 | Herrmann et al. | |
| 7,329,758 B1 * | 2/2008 | Grubbs | C07F 15/0046 502/155 |
| 7,378,528 B2 | 5/2008 | Herrmann et al. | |
| 7,413,694 B2 | 8/2008 | Waldrop et al. | |
| 7,652,145 B2 | 1/2010 | Herrmann et al. | |
| 7,671,224 B2 | 3/2010 | Winde et al. | |
| 7,687,635 B2 | 3/2010 | Walter et al. | |
| 7,727,449 B2 | 6/2010 | Lorenz et al. | |
| 7,803,302 B2 | 9/2010 | Hansen | |
| 7,902,279 B2 | 3/2011 | Lin | |
| 9,156,208 B2 * | 10/2015 | Heim | B29C 70/443 |
| 2003/0055262 A1 | 3/2003 | Grubbs et al. | |
| 2006/0266577 A1 * | 11/2006 | Inoue | H04R 7/10 181/167 |
| 2007/0043188 A1 | 2/2007 | Schaubroeck et al. | |

10: Mold surface
11: Fibrous reinforcement (preform)
12: Peel ply
14: Secondary resin distribution media
15: Vacuum bag
16: Resin Inlet
17: Vacuum outlet
18: air-tight cavity
20: Resin flow control structure (above)
21: Resin flow control structure (below)
30: Resin distribution media

| | | | |
|---|---|---|---|
| 2007/0185343 | A1 | 8/2007 | Verpoort et al. |
| 2008/0220112 | A1 | 9/2008 | Waldrop et al. |
| 2008/0277053 | A1 | 11/2008 | Stiesdal |
| 2008/0293905 | A9 | 11/2008 | Schaubroeck et al. |
| 2010/0174068 | A1 | 7/2010 | Grela et al. |
| 2010/0285297 | A1 | 11/2010 | Bansal et al. |
| 2011/0100541 | A1* | 5/2011 | Shindo .................. B29C 70/548 156/245 |
| 2013/0244514 | A1* | 9/2013 | Scott ................... B63B 35/7926 441/79 |
| 2013/0287589 | A1* | 10/2013 | Adamse ............... B29C 70/443 416/241 A |

FOREIGN PATENT DOCUMENTS

| | | |
|---|---|---|
| CN | 1554531 A | 12/2004 |
| JP | 2007-076307 A | 3/2007 |
| WO | 02/14376 A2 | 2/2002 |
| WO | 02/079208 A2 | 10/2002 |
| WO | 03/011455 A1 | 2/2003 |
| WO | WO 2010021740 * | 2/2010 |
| WO | 2010/037550 A1 | 4/2010 |
| WO | 2012/026980 A2 | 3/2012 |

OTHER PUBLICATIONS

Label License, Product: Grubbs Catalyst C827, Materia, Inc., 2015, 1 page.*

Bender et al., "Flow rate control during vacuum-assisted resin transfer molding (VARTM) processing", Composites Science and Technology, 66 (2006), pp. 2265-2271.

Greene et al., Protective Groups in Organic Synthesis, 3rd Ed. (New York: Wiley, 1999).

Lawrence et al., "Simulation and Validation of Resin Flow During Manufacturing of Composite Panels Containing Embedded Impermeable Inserts With the VARTM Process," Polymer Composites pp. 442-450 (2007).

Schwab et al., J. Am. Chem. Soc. 118:100-110 (1996).

Scholl et al., Org. Lett. 6:953-956 (1999).

Sanford et al., J. Am. Chem. Soc. 123:749-750 (2001).

International Search Report for PCT International Application PCT/US2011/001488, dated May 1, 2012.

English-language Abstract of JP 2007-076307 A.

International Preliminary Report on Patentability for PCT/US2011/001488 dated Mar. 7, 2013.

Office Action in CN Application No. 201180049055.6 dated Oct. 29, 2014.

* cited by examiner

*Primary Examiner* — Matthew Daniels

(74) *Attorney, Agent, or Firm* — J.A. Lindeman & Co., PLLC

(57) ABSTRACT

A vacuum-assisted resin transfer molding (VARTM) method is disclosed, the method comprising: providing a vacuum-assisted resin transfer mold assembly comprising a mold having a first mold surface and a second mold surface arranged to enclose a laminate assembly within a space between the first and second mold surfaces when the laminate assembly is placed on the first mold surface; providing a laminate assembly comprising a laminate pre-form, a peel ply, and a resin distribution media pervious to the flow of a resin, the laminate pre-form having first and second surfaces, the first surface of the pre-form positioned to be in contact with the first mold surface, the peel ply positioned such that the second surface of the laminate pre-form is in contact with the peel ply, and the resin distribution media positioned to be contained within the first and second mold surfaces; positioning at least one resin flow control structure to modify the flow of resin within the resin distribution media; providing at least one inlet and at least one outlet in the laminate assembly such that the resin can be introduced into the assembly through the inlet; arranging and sealing the second mold surface to enclose the laminate assembly within the space between the first and second mold surfaces such that a vacuum can be pulled on the laminate assembly contained within the space between the first and second mold surfaces; applying a vacuum to the mold assembly; allowing the resin to flow into the laminate assembly through the at least one inlet such that the resin flow into the resin distribution media; allowing the resin to flow out of the laminate assembly through the at least one outlet; and allowing the resin to cure in the laminate material. An article of manufacture made by said VARTM method.

23 Claims, 20 Drawing Sheets

10: Mold surface
11: Fibrous reinforcement (preform)
12: Peel ply
14: Secondary resin distribution media
15: Vacuum bag
16: Resin Inlet
17: Vacuum outlet
18: air-tight cavity
20: Resin flow control structure (above)
21: Resin flow control structure (below)
30: Resin distribution media 10: Mold surface
11: Fibrous reinforcement (preform)
12: Peel ply
14: Secondary resin distribution media
16: Resin Inlet Port
17: Vacuum Outlet Port
18: air-tight cavity (not shown)
20: Resin flow control structure (above)
21: Resin flow control structure (below)
30: Resin distribution media 20, 21: Resin flow control structures
30: Resin distribution media 20, 21, 22: Resin flow control structures
30, 31: Resin distribution media

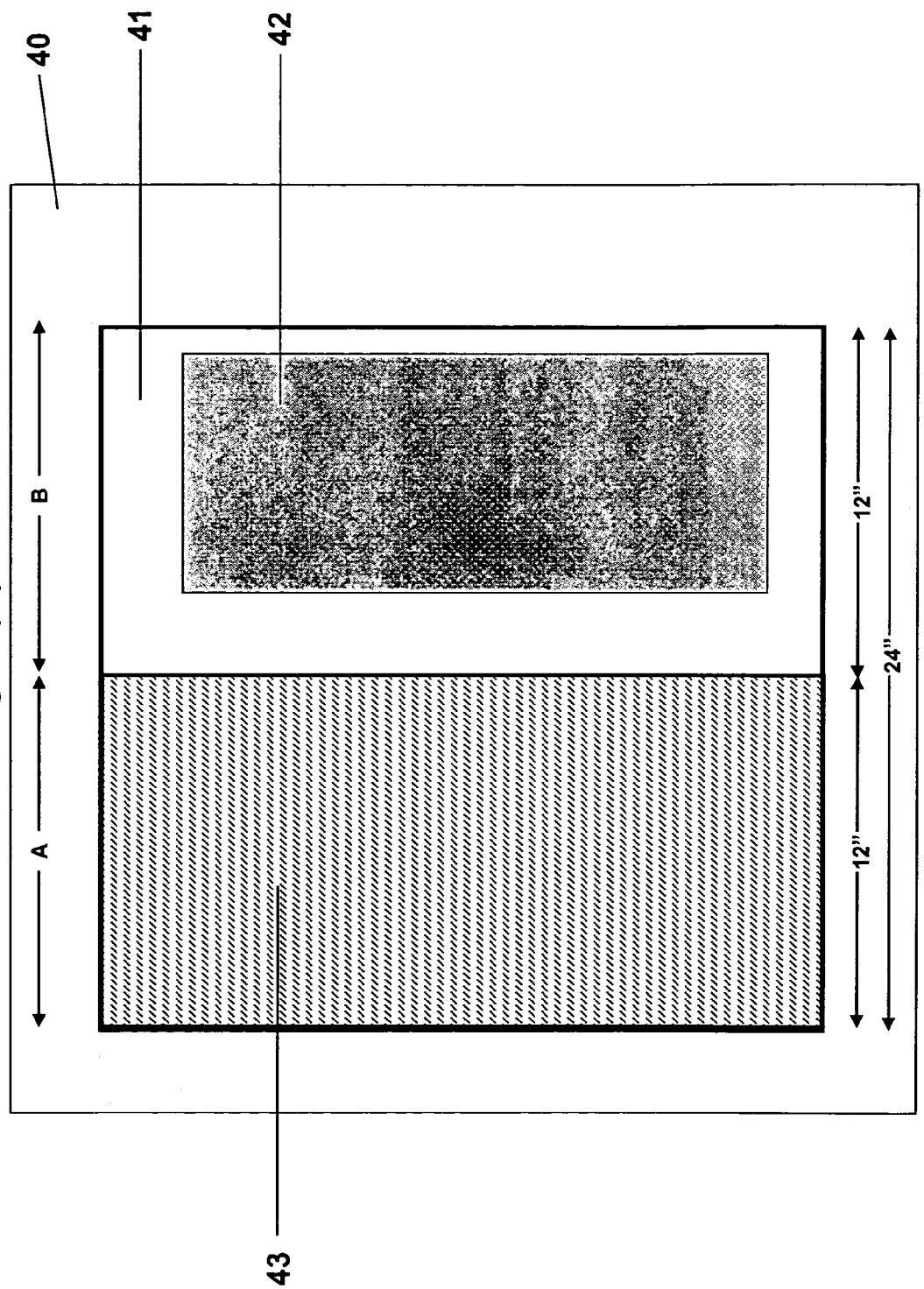

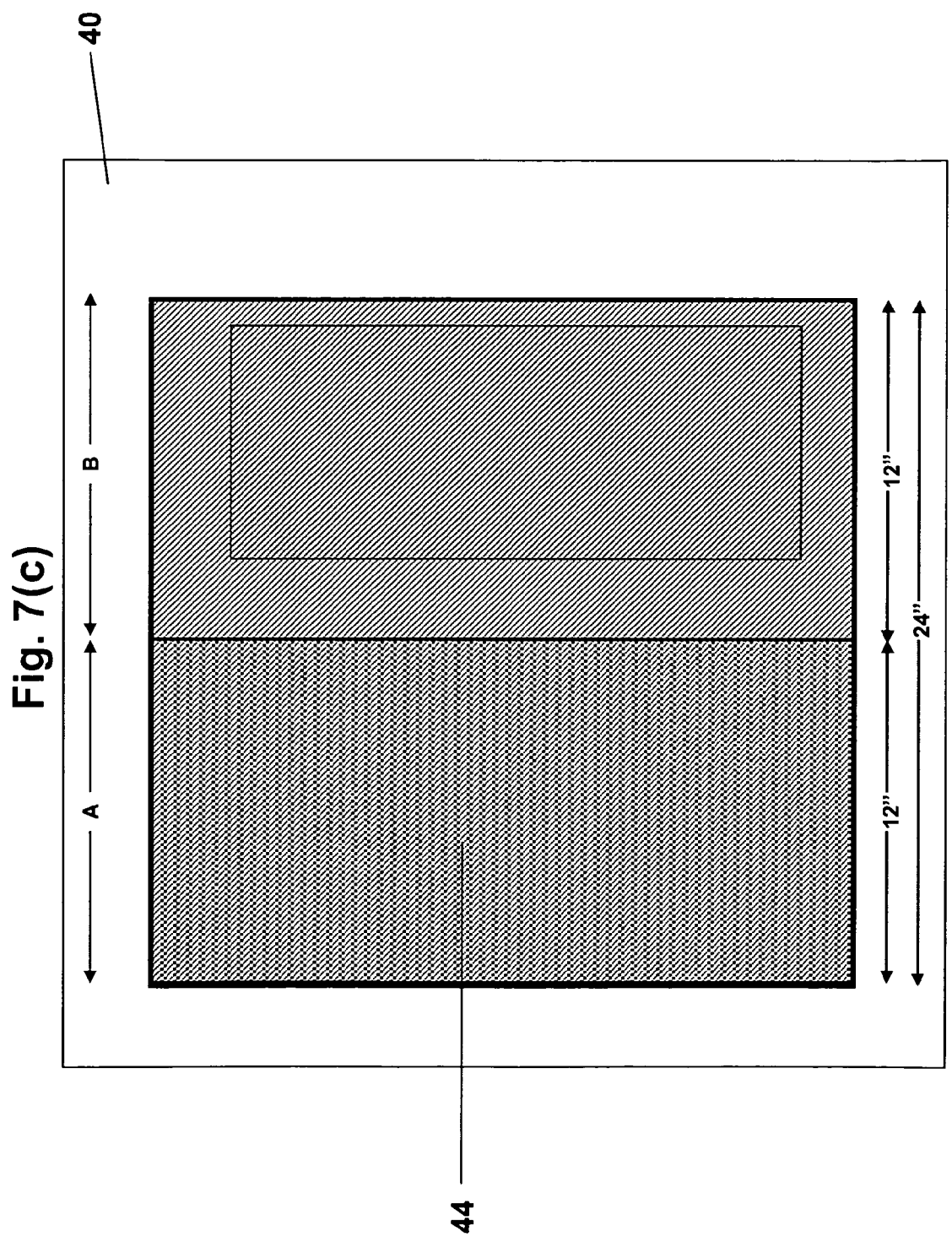

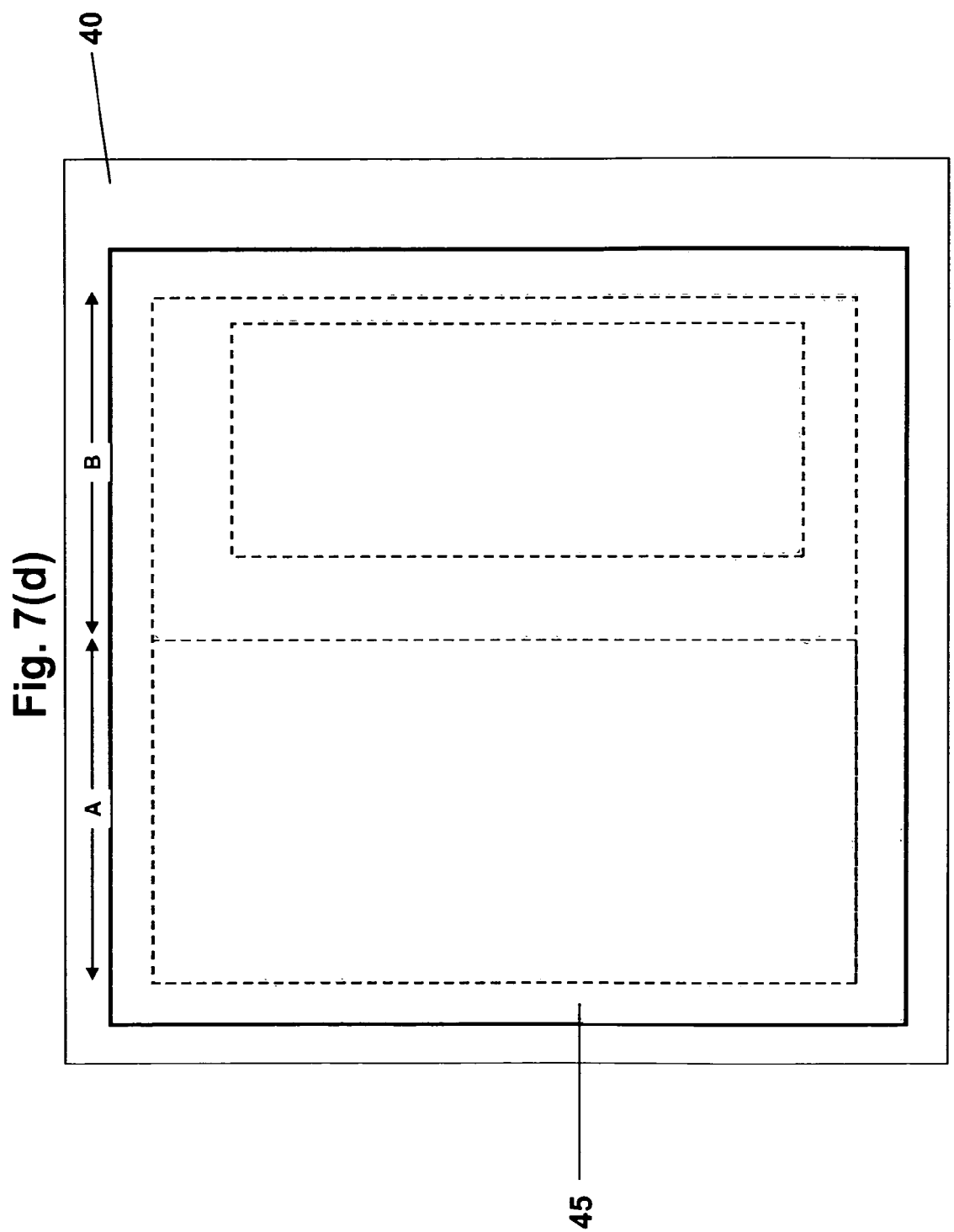

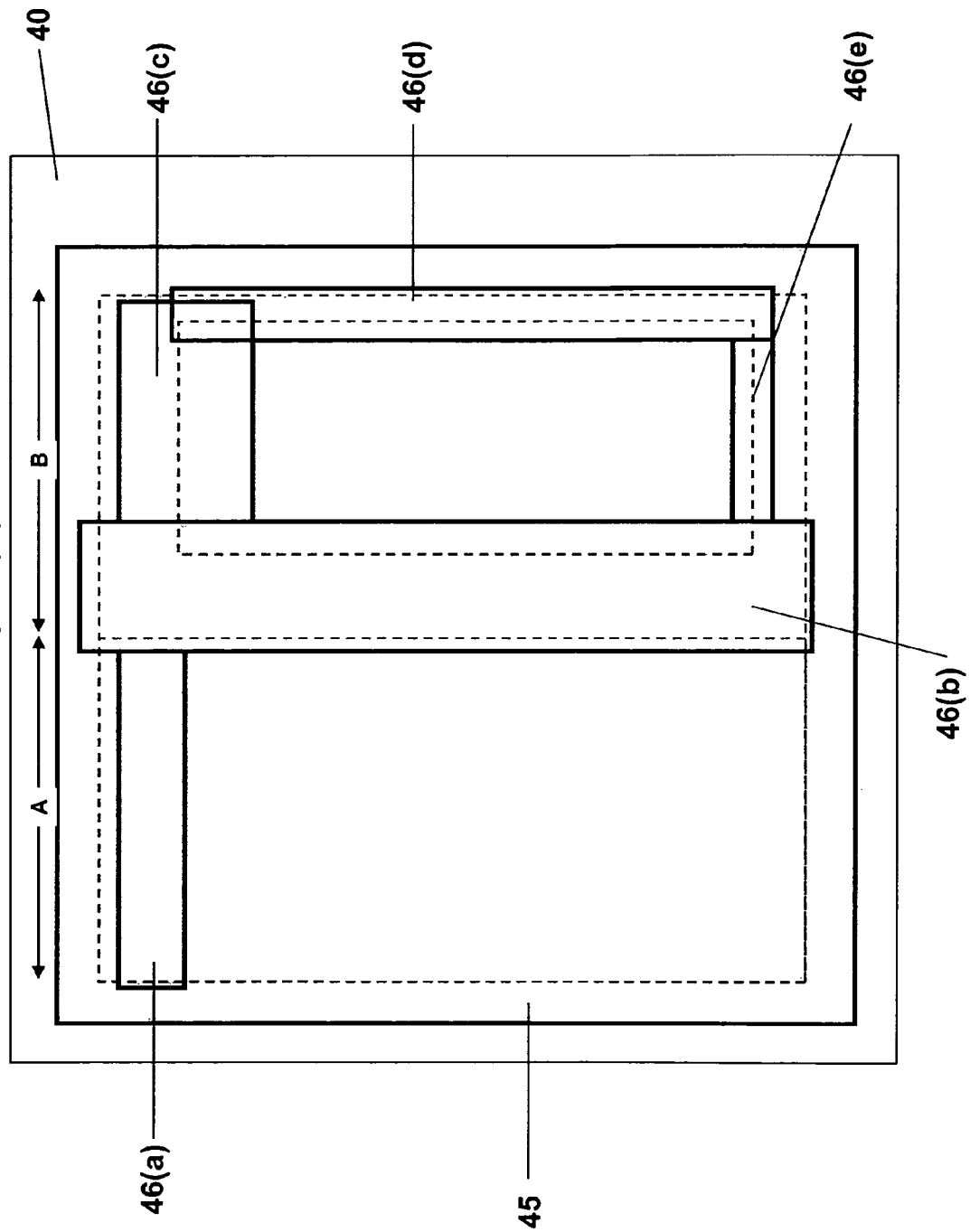

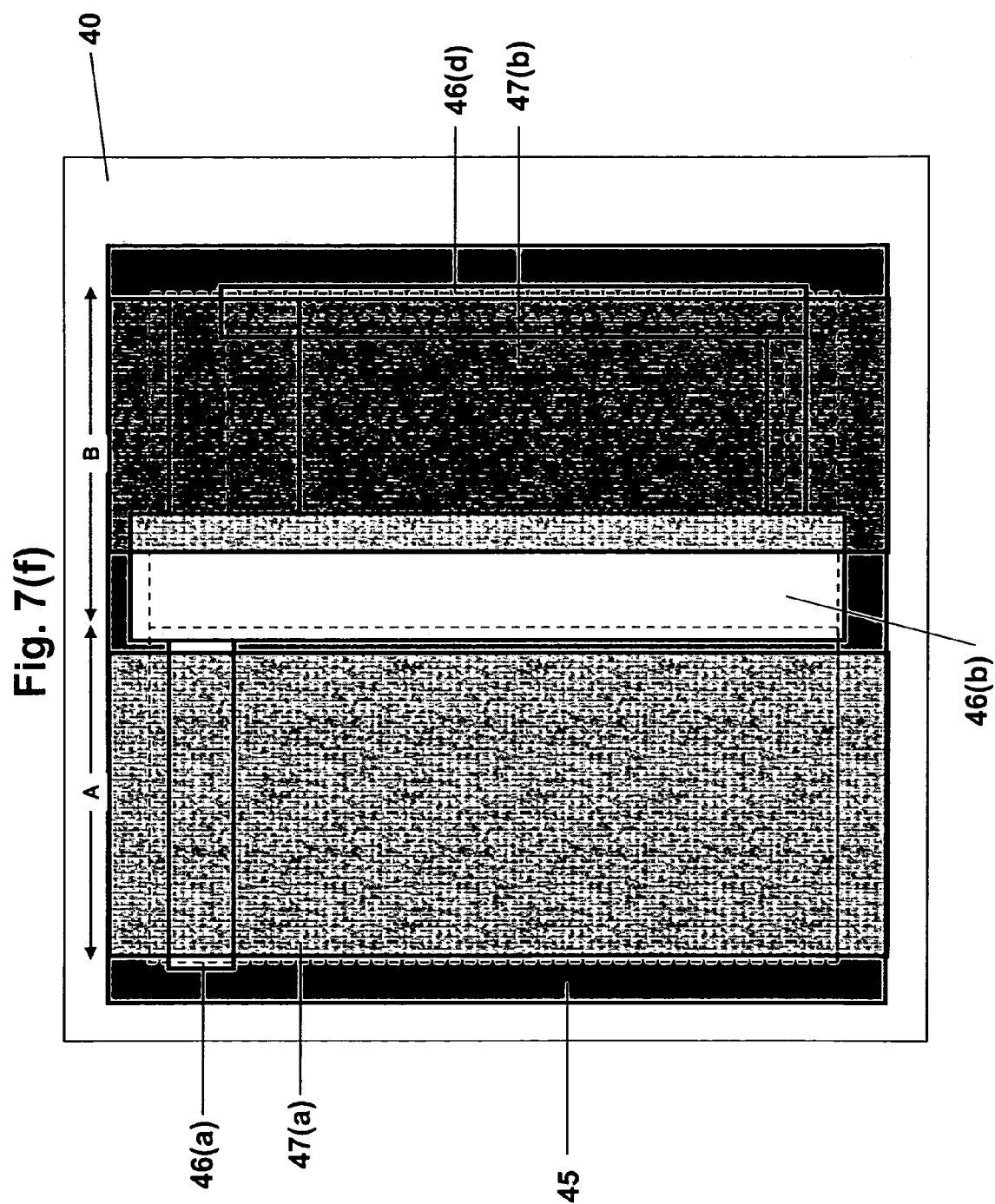

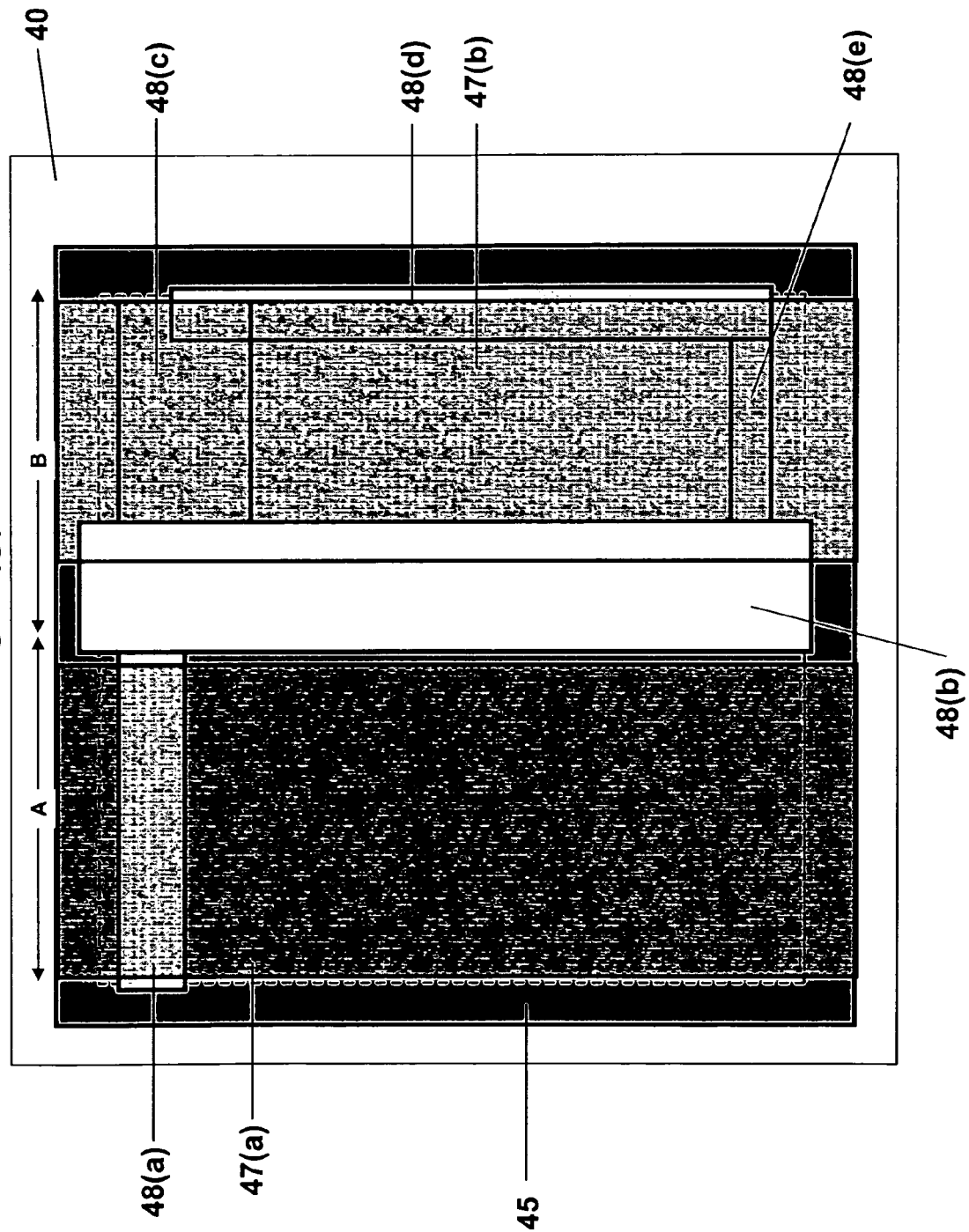

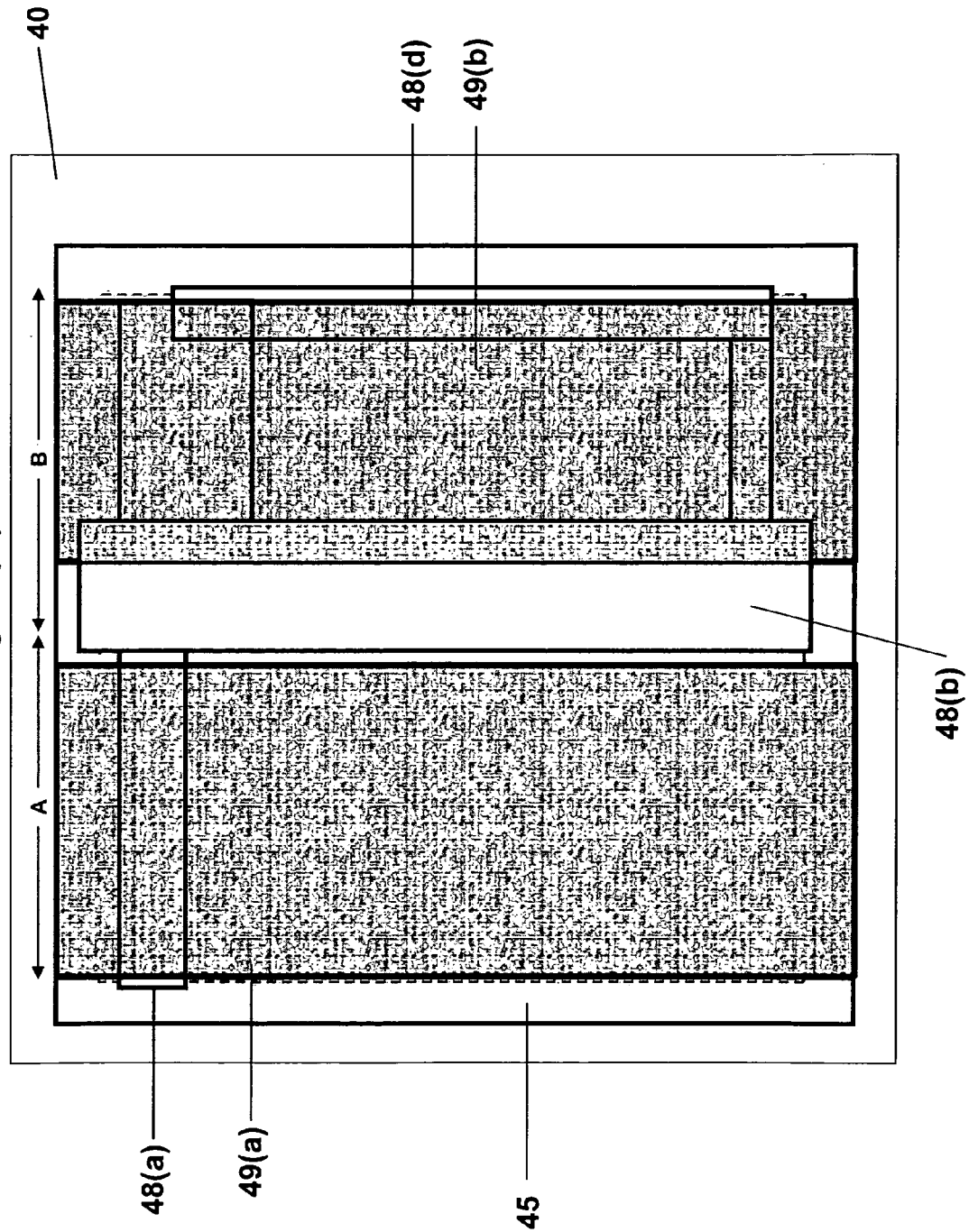

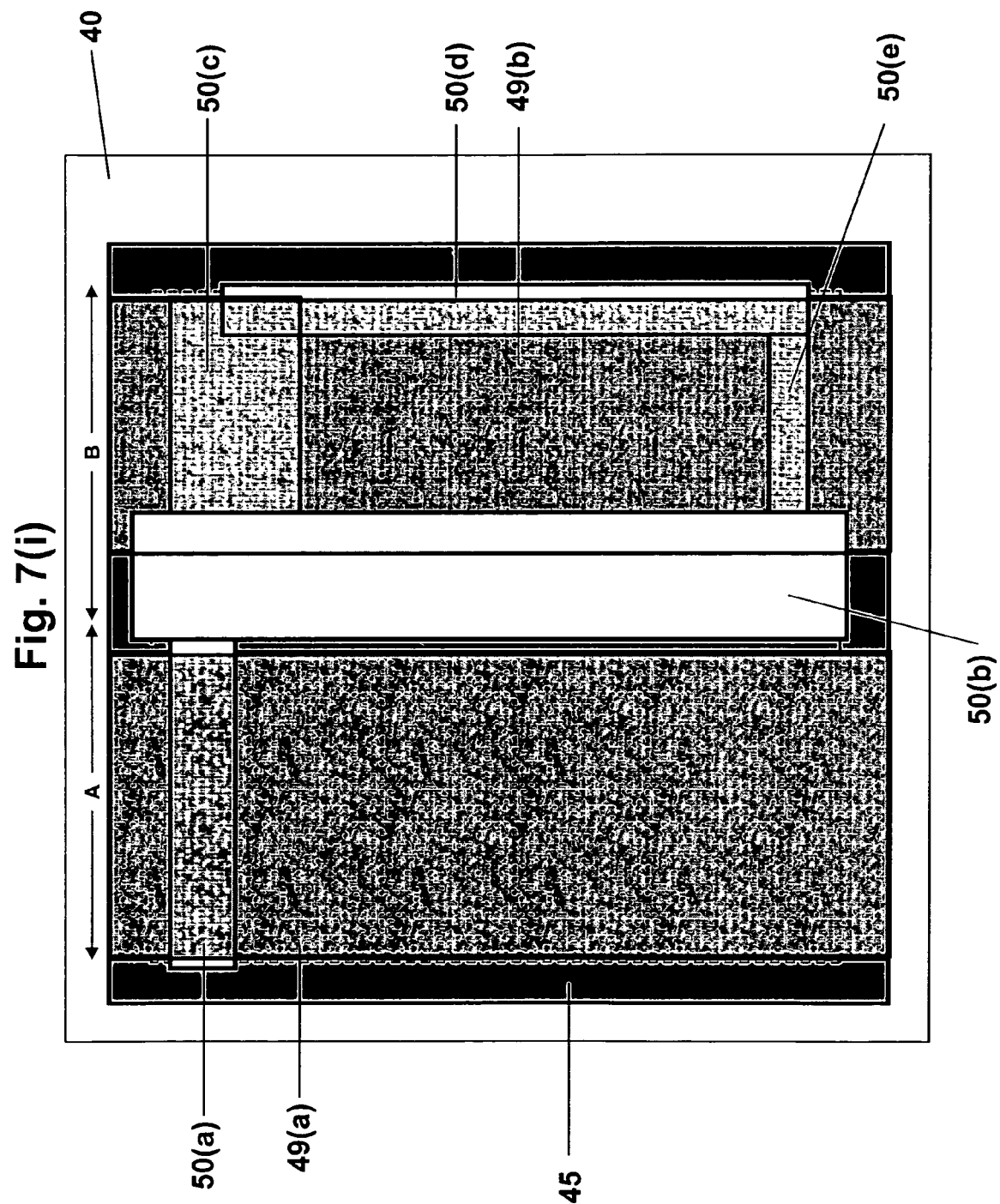

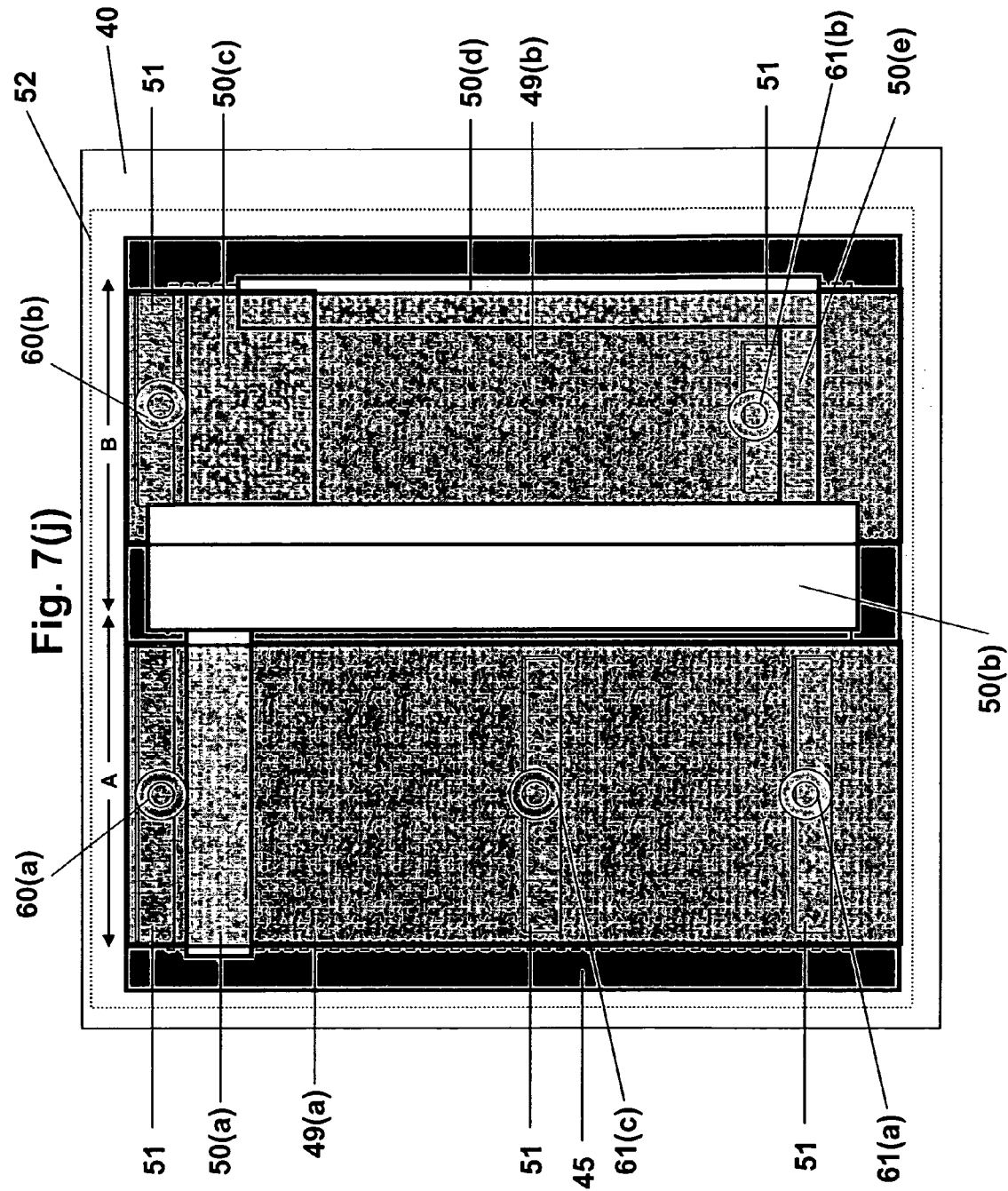

10: Mold surface
11: Fibrous reinforcement (preform)
12: Peel ply
14: Secondary resin distribution media
16: Resin Inlet Port
17: Vacuum Outlet Port
18: Vacuum Bag/air-tight cavity (not shown)
30: Resin distribution media 10: Mold surface
11: Fibrous reinforcement (preform)
12: Peel ply
14: Secondary resin distribution media
16: Resin Inlet Port
17: Vacuum Outlet Port
18: Vacuum Bag/air-tight cavity (not shown)
30: Resin distribution media
31: Resin distribution media 10: Mold surface
11: Fibrous reinforcement (preform)
12: Peel ply
14: Secondary resin distribution media
16: Resin Inlet Port
17: Vacuum Outlet Port
18: Vacuum Bag/air-tight cavity (not shown)
20: Resin flow control structure (above)
21: Resin flow control structure (below)
30: Resin distribution media

VARTM FLOW MODIFICATIONS FOR LOW VISCOSITY RESIN SYSTEMS

RELATED APPLICATIONS

This application claims the benefit of U.S. Provisional Patent Application No. 61/376,253, filed Aug. 23, 2010 and U.S. Provisional Patent Application No. 61/497,880, filed Jun. 16, 2011 and the contents of each are incorporated herein by reference.

TECHNICAL FIELD

The present invention relates to methods for controlling the flow of low-viscosity resins in resin transfer molding (RTM), in particular, vacuum-assisted resin transfer molding (VARTM), processes to ensure complete and uniform resin distribution in thick composite laminates. More particularly, the invention relates to incorporation of resin flow control structures to moderate or control resin flow without external intervention.

BACKGROUND

Composite infusions, such as, for example, VARTM, are closed-mold processes for fabricating large fiber-reinforced composite structures. In its simplest manifestation of composite infusions, a laminate fiber preform is installed onto a mold surface and sealed with an outer mold surface, for example, an outer sheet of flexible bagging material such as nylon or Mylar plastic. In VARTM, a vacuum is applied to remove entrapped air from the preform and resin is then allowed to infuse into the preform and cure. As the typical thermoset resins utilized for composite fabrication tend to have high viscosities (generally 150 centipoise (cp) or greater), processing techniques have been developed to improve the speed and quality of resin infusion. In particular, a variety of types of resin distribution media have been developed to promote resin flow.

There are three basic types of VARTM. Type 1 utilizes a resin distribution media over the top of the laminate, between the preform and the bagging material. Type 2 uses a sandwich core as a resin distribution media within the laminate. Type 3 uses specialized materials within the laminate itself as resin distribution media which unlike Type 1 stay in the composite component. For example, in Type 1 VARTM, the material is carried over the laminate in the x-y plane in the resin distribution media (a very permeable layer) and allowed to percolate or flow down into the laminate in the z direction through an easily separated layer (peel ply) to completely fill the laminate with resin. This minimizes the actual through-ply flow required for the thickness or z direction. Typical infusion resins have high viscosities (typically 200-600 cp at 25° C.), so choice of the correct resin distribution media for over-the-top flow is required to strike a balance between flow in the x-y plane and through-ply flow in the z direction.

As described in, for example, U.S. Pat. Nos. 5,840,238, 6,310,121, and 6,525,125, the disclosures of each of which are incorporated herein by reference, polymers generated by olefin metathesis processes are attractive as composite matrix materials. Of particularly beneficial use are the polymers generated by the ring opening metathesis polymerization (ROMP) of cyclic olefins. The low viscosity of cyclic olefin resin formulations and the ability to control ROMP kinetics (e.g., U.S. Pat. Nos. 4,708,969 and 5,939,504, the disclosures of which are incorporated herein by reference) facilitate composite processing and manufacture, and the corrosion resistance and high toughness of ROMP polymers leads to good composite durability. Commercially important ROMP resin formulations are generally based on readily available and inexpensive cyclic olefins such as dicyclopentadiene (DCPD), norbornenes, cyclooctadiene (COD), and various cycloalkenes.

Although the extremely low viscosities of ROMP resin formulations are attractive for rapid VARTM processing, they also present unique challenges. For example, typical high-viscosity resins tend to be slow-paced and self-correcting and forgiving. Voids and channels fill slowly and problems with competing flow rates due to differences in permeability within parts of the laminate are minimized. However, when one changes to ROMP resins with $1/10^{th}$ to $1/20^{th}$ or less of this viscosity, flow control issues are magnified and as a result most of the techniques used with the more viscous resins no longer yield acceptable results. FIG. 1(*a*) shows a simple depiction of an infusion set-up containing a resin distribution media (1), a reinforcement layer (2), and a mold surface (3). As resin is introduced into this evacuated infusion set-up in FIG. 1(*b*), resin flows rapidly along the resin distribution media (1) (x-y plane) and infuses more slowly into the reinforcement layer (2) (z direction) due to the permeability difference between the resin distribution media layer (1) and the reinforcement layer (2). This permeability difference may create a severe lead-lag (4), leading to areas within the reinforcement layer (2) with poor resin impregnation and possible void formation. As shown in FIGS. 1(*c*) and 1(*d*), as the resin continues to flow along the resin distribution media (1) (x-y plane) and infuses into the reinforcement layer (2) (z direction), the lead-lag may lead to areas of poor resin impregnation (i.e., dry spots or voids) (5). These areas of poor resin impregnation can lead to poor results, reduced mechanical properties, rejected parts, etc.

One of the tenets of resin infusion methods, such as VARTM, or any process involving liquid movement through a permeable media, is that liquid will follow the path of least resistance. Further, once such a path is established, backfill of unfilled areas is usually impossible. In composites, an unfilled part is a failed part. Whereas thicker, higher viscosity resins will be self correcting in this regard, lower viscosity resins (typically less than 100 cp at 40° C., for example, 1-50 cp, 5-25 cp, or 10-20 cp at 40° C.) require greater control. The current invention describes the incorporation of lower-permeability resin flow control structures to moderate the flow of resin (e.g., flow rates, flow direction, etc.) through resin distribution media layers and ensure full "wet out" (i.e., infusion of the desired amount of resin into the laminate to achieve the desired fiber volume in the composite) of all lamina. However, these pause points must be a balance of delay and promotion of flow to allow a full infusion of all lamina. Whereas the majority of VARTM improvements are aimed at trying to promote flow (i.e., increase the infusion rate because of the high viscosity of the resins), the low-viscosity resins require a balance of resin flow rates to allow optimal composite fill time while maintaining full and complete resin infusion into the reinforcement layers. Control of the flow in this manner ensures full and complete infusion without dry areas. One should remember that until the current generation of low-viscosity resins (e.g., ROMP resins), such resin flow techniques were unnecessary.

The invention describes the incorporation of resin flow control structures in an RTM process, such as VARTM infusion, allowing improved control of resin flow patterns with low-viscosity resins. Use of resin distribution media with high resin permeability allows for rapid resin delivery to key areas of the composite. Addition of resin flow control structures allows for modification of the resin flow in the distribution media, allowing control over resin lead-lag and resin channeling patterns to ensure full resin impregnation of the composite and to prevent voids and dry spots. This control is a combination of materials, process, and technique.

SUMMARY OF THE INVENTION

The invention is directed to addressing one or more of the aforementioned concerns and relates to a group of related processing techniques which enable the flow of resin to be controlled in RTM, in particular, VARTM. In this case, speed up and delay have been found to be necessary to insure full fill in VARTM, especially for low-viscosity resins (typically less than 100 cp at 40° C., for example, 1-50 cp, 5-25 cp, or 10-20 cp at 40° C.). More particularly, resin flow control structures of the invention serve to control the flow without further external intervention. Once incorporated into the setup, the resin flow control structures of the invention may be used to control or moderate the flow rate, or to transfer the flow to another area of a composite or laminate material.

In one embodiment, the invention is directed to a VARTM method, the method comprising:

providing a VARTM mold assembly comprising a mold having a first mold surface and a second mold surface (e.g., a vacuum bag) arranged to enclose a laminate assembly within a space between the first and second mold surfaces when the laminate assembly is placed on the first mold surface;

providing a laminate assembly comprising a laminate pre-form, a peel ply, and a resin distribution media pervious to the flow of resin, the laminate pre-form having first and second surfaces, the first surface of the pre-form optionally positioned to be in contact with the first mold surface, the peel ply positioned such that the second surface of the laminate pre-form is in contact with the peel ply, and the resin distribution media positioned to be contained within the first and second mold surfaces;

positioning at least one resin flow control structure to modify the flow of resin within the resin distribution media;

providing at least one inlet and at least one outlet in the laminate assembly such that resin can be introduced into the laminate assembly through the inlet;

arranging and sealing the second mold surface to enclose the laminate assembly within the space between the first and second mold surfaces such that a vacuum can be pulled on the laminate assembly contained within the space between the first and second mold surfaces;

applying a vacuum to the mold assembly;

allowing a resin to flow into the laminate assembly through the at least one inlet such that the resin flows into the resin distribution media;

allowing the resin to flow out of the laminate assembly through the at least one outlet; and allowing the resin to cure in the laminate assembly to form a laminate material.

In another embodiment, the invention is directed to a VARTM apparatus, the apparatus comprising:

a VARTM mold assembly comprising a mold having a first mold surface and a second mold surface arranged to enclose a laminate assembly within a space between the first and second mold surfaces when the laminate assembly is placed on the first mold surface;

a laminate assembly comprising a laminate pre-form, a peel ply, a resin distribution media pervious to the flow of resin, an inlet port, and an outlet port, the laminate pre-form having first and second surfaces, with the first surface of the pre-form in contact with the first mold surface, the second surface of the pre-form in contact with the peel ply, and the resin distribution media contained within the laminate pre-form or in contact with the peel ply;

at least one resin flow control structure to modify the flow of resin within the resin distribution media;

means for drawing a vacuum on the mold assembly; and means for allowing resin to flow into the laminate assembly through the inlet port such that the resin flows into the resin distribution media.

In another embodiment, the invention is directed to articles of manufacture made using the disclosed method and/or apparatus, including, for example, composite articles made from a fiber-reinforced resin matrix. By way of example, such composite articles can include jet engine blades, jet engine nacelles, vehicular panels and articles, including, e.g., boat hulls, car bodies and components, wind turbine blades, aircraft structures such as wings, wing parts, radar domes, fuselage components, nose cones, flap tracks, landing gear and rear bulkhead.

These and other aspects of the invention will be apparent to the skilled artisan in light of the following detailed description and examples.

BRIEF DESCRIPTION OF THE DRAWINGS

FIG. 7(b) depicts the second layer of FIG. 7.
FIG. 7(c) depicts the third layer of FIG. 7.
FIG. 7(d) depicts the fourth layer of FIG. 7.
FIG. 7(e) depicts the fifth layer of FIG. 7.
FIG. 7(f) depicts the sixth layer of FIG. 7.
FIG. 7(g) depicts the seventh layer of FIG. 7.
FIG. 7(h) depicts the eighth layer of FIG. 7.
FIG. 7(i) depicts the ninth layer of FIG. 7.
FIG. 7(j) depicts the tenth layer of FIG. 7.

DETAILED DESCRIPTION OF THE DISCLOSURE

Terminology and Definitions

Figure 1:
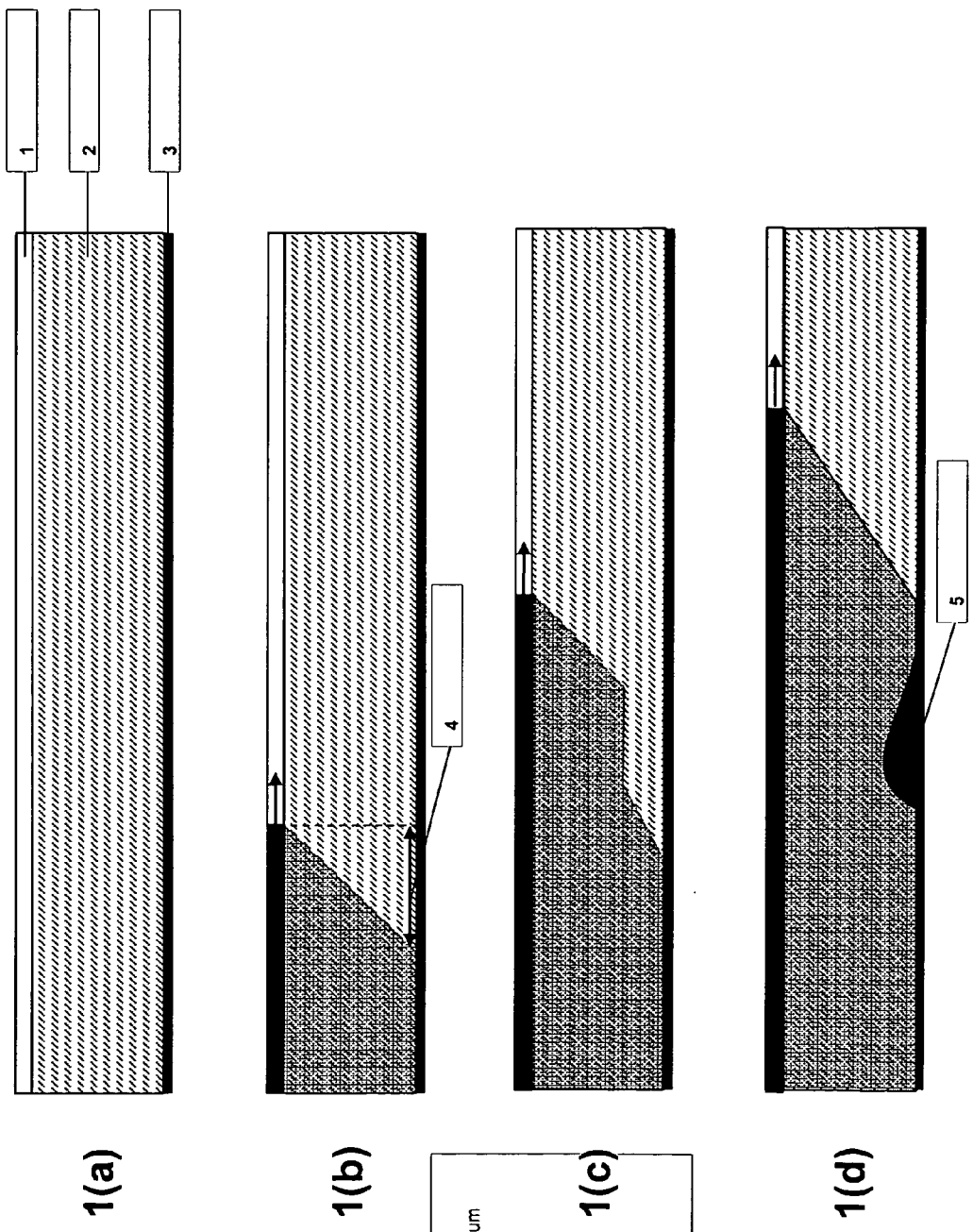
FIG. 1(a)-1(d) depict resin flow through resin distribution media into the laminate reinforcement material leading to void formation as described herein.

Unless otherwise indicated, the invention is not limited to specific reactants, substituents, catalysts, reaction conditions, or the like, as such may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 12 carbon atoms. The term "lower alkyl" refers to an alkyl group of 1 to 6 carbon atoms, and the specific term "cycloalkyl" refers to a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" refers to an alkenyl group of 2 to 6 carbon atoms, and the specific term "cycloalkenyl" refers to a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" refers to an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl wherein "alkyl," "aryl," and "aralkyl" are as defined above.

Additionally, the term "acyl" also refers to substituents having the formula —(CO)-alkaryl, —(CO)-alkenyl, or —(CO)-alkynyl and the term "acyloxy" also refers to substituents having the formula —O(CO)-alkaryl, —O(CO)-alkenyl, —O(CO)-alkynyl wherein", "alkaryl", "alkenyl", and "alkynyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" refers to a divalent hydrocarbyl moiety containing 1 to about 30 carbon atoms, preferably 1 to about 24 carbon atoms, most preferably 1 to about 12 carbon atoms, including linear, branched, cyclic, saturated, and unsaturated species. The term "lower hydrocarbylene" refers to a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus, or silicon, typically nitrogen, oxygen, or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of het-eroatom-containing alicyclic groups are pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO$^-$), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl (—(CS)—N($C_1$-$C_{24}$ alkyl)($C_5$-$C_{24}$ aryl), carbamido (—NH—(CO)—NH$_2$), cyano (—C≡N), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino (—NH($C_1$-$C_{24}$ alkyl), di-($C_1$-$C_{24}$ alkyl)-substituted amino (—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CR═NH where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR═N(alkyl), where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR═N(aryl), where R includes without limitation hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O$^-$), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl —SO$_2$—N(H)alkyl), $C_1$-$C_{24}$ dialkylaminosulfonyl —SO$_2$—N(alkyl)$_2$, $C_5$-$C_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phosphonato (—P(O)(O$^-$)$_2$), phosphinato (—P(O)(O$^-$)), phospho (—PO$_2$), and phosphino (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl). Additionally "Fn" may be isocyanate (—N═C═O) or thioisocyanate (—N═C═S).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically mentioned above. Analogously, the abovementioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "laminate pre-form," as used herein, generally refers to any material that resin compositions as used in the invention may be contacted with, applied to, or otherwise allowed to flow into the laminate material, such that the resin is contained within the laminate material. Without limitation, such materials include reinforcing materials, such as filaments, fibers, rovings, mats, weaves, fabrics, knitted material, cloth or other known structures, glass fibers and fabrics, carbon fibers and fabrics, aramid fibers and fabrics, and polyolefin or other polymer fibers or fabrics. Other suitable materials include metallic density modulators, microparticulate density modulators, such as microspheres, and macroparticulate density modulators, such as glass or ceramic beads.

The term "resin distribution media," as used herein, means any two-dimension flowing aid used for resin feeds, especially in vacuum infusion processes. Resin distribution media is typically an open structured coarse media used initially as a vacuum pathway to evacuate dry reinforcement prior to infusion. The resin distribution media provides a relatively high-permeability path for resin introduced into the lay-up assembly to be rapidly distributed to the laminate preform. Non-limiting examples of resin distribution media/ products include Enkafusion®, Airtech Greenflow® 75, Soric®, common nursery-type shade cloth, fish netting, and internal media like non-wovens, such as polypropylene, polyethylene, nylon or PET, continuous strand mat, or other similar materials.

The term "preform," as used herein, refers collectively to the one or more layers of reinforcement materials that are to be infused with resin. The preform may contain multiple different types of reinforcement materials or different constructions of materials, and may also include cores and/or other structural layers. The preform may also contain non-structural layers as required for production of the desired composite laminate.

The term "layup," as used herein, refers to the combination of the reinforcement preform with any portion thereof or all of the additional infusion components, particularly peel ply, resin distribution media, resin flow control structure, vacuum bagging material, and mold surface.

The term "lead-lag," as used herein, refers to the phenomenon in which the use of resin distribution media layers create a fast-moving resin infusion front in the areas of the reinforcement preform directly adjacent to the resin distribution layers, while the resin infusion front in areas further from the resin distribution layer may lag significantly behind.

As used herein, the term "modify," in the context of the resin control flow structures, means controlling (e.g., decreasing) the rate of resin flow in or through the resin distribution media, changing the direction of the resin flow in or through the resin distribution media to another area of a composite or laminate material, changing the permeation characteristics of the resin distribution media, obstructing the cross-sectional flow area of the resin distribution media, creating regions of decreased permeability within or through the resin distribution media, or some combination thereof.

Resin Flow Control Structures

The flow control measures described herein typically include those in which the flow rate and/or the direction of resin flow is modified to minimize void formation and ensure full filling of pre-form materials. Resin flow control structures of the invention allow for rapid resin flow through resin distribution media for portions of the infusion, while slowing resin flow in key regions to create a more uniform flow front and minimize areas of low resin-impregnation of the reinforcement layers. The use of resin flow control structures to decrease flow in regions of the laminate allows for controlled resin flow fronts, for example, in areas prone to void formation, such as core sandwich structures, ply-drops, and areas of sharp curvature. These techniques may be conveniently performed in a disposable upper flow layer so as not to affect the part or laminate itself.

Although flat panels are used to illustrate non-limiting embodiments of the invention in the figures, the invention is not so limited and can be used for panels of any geometry, including areas of curvature, reinforcement layer thickness changes, and variable reinforcement materials or constructions. The resin flow control structures of the invention may be used in conjunction with any infusion methods known in the art (e.g., SCRIMP, RTM, VIP, VEC, and other forms of over-the-top and through-ply infusion).

Figure 2:
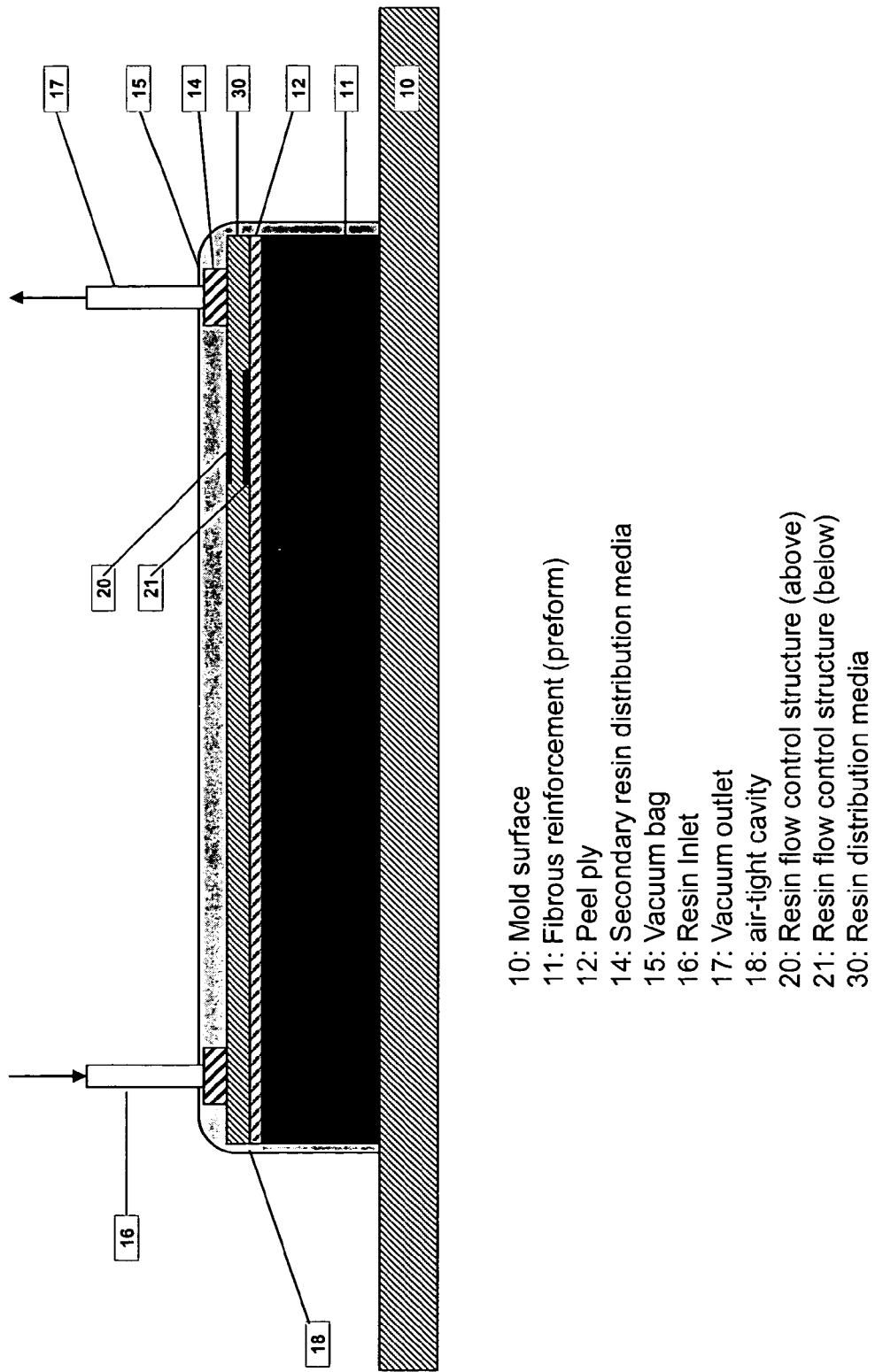
FIG. 2 depicts a side-view of a VARTM infusion incorporating resin flow control structures of the invention.
Figure 3:
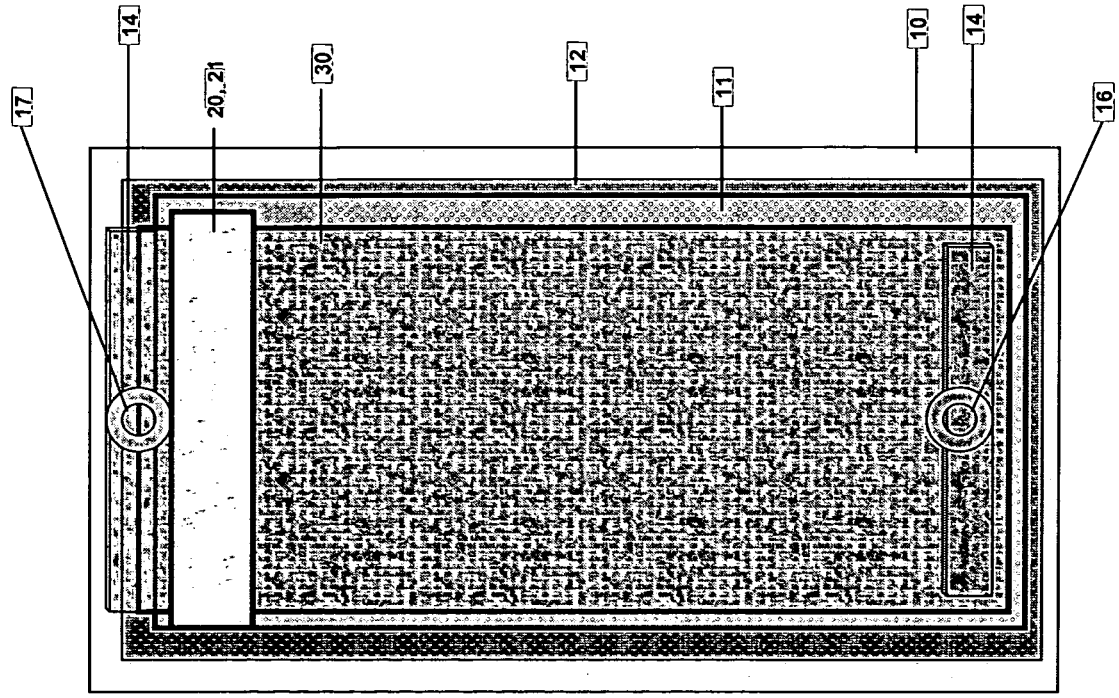
FIG. 3 depicts a top-view of a VARTM infusion incorporating resin flow control structures of the invention.

In one embodiment of the invention, a flat mold surface (10) is shown in FIGS. 2 and 3, for example, although the mold surface may be of any geometry, for example, curved. The mold may be constructed of any appropriate material, including steel, aluminum, or composite, and may be of any dimension. The mold surface may be treated with sealants and/or release agents.

One or more layers of fibrous reinforcement material may be arranged on the mold surface (10) in any desired position and/or orientation to form a fibrous reinforcement preform (11). The one or more layers of fibrous reinforcement material may be the same or different composition and can be the same or different dimensions (e.g., width, length, thickness, shape, etc.) and/or may be arranged (e.g., weaved) in any construction or orientation. Suitable reinforcing materials include, for example, those that add to the strength or stiffness of a polymer composite when incorporated with the polymer. Non-limiting examples of reinforcing materials can be in the form of filaments, fibers, rovings, mats, weaves, fabrics, knitted material, cloth, PVC, PAN, PET, balsa, paper honeycomb, PP honeycomb of composite reinforcement, glass, Kevlar®, Spectra®, graphite, basalt, boron, or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra® trade name), and polyoxazole fibers or fabrics (such as those produced by the Toyobo Corporation under the Zylon® trade name).

Other examples of reinforcement materials include core materials, such as, for example, various polymer foams, Nida-Core DIAB PVC, Gurit Corecell®, Airex® PVC and PET, Armacell® PET, ProBalsa® balsa, and BALTEK® balsa.

In other embodiments, gel coats, such as, for example, urethane, polyester, vinylester, or epoxy, may be deposited between the mold surface (10) and the reinforcement preform (11).

A peel ply (12) is optionally positioned on the top and/or bottom of the reinforcement preform (11). Peel ply materials are typically porous films, which allow resin to flow freely through the layer without bonding to the composite material formed in the infusion process. Suitable peel plies include nylon, fabrics, polyester fabrics, glass fabrics, or any fabric with a release coating based on fluoropolymer or silicone polymer. The peel ply may be of any desired dimension.

In other embodiments, lower peel-ply, such as, for example, release films such as Airtech WRIGHTLON® Blue, fluoropolymer, and others like Tedlar®, may be used.

One or more resin distribution media (30) is disposed on the surface of the peel ply (12). Resin distribution media (30) is arranged to provide high-permeability resin flow to a portion of the infusion. In other embodiments, the resin distribution media may be positioned on only a portion of the of the peel ply and/or reinforcement layer. In other embodiments, one or more resin distribution media may be positioned elsewhere in the layup, for example, within the reinforcement layers themselves and/or between the mold surface and reinforcement layer. In addition, the resin distribution media may be cut and separated creating gaps or breaks in the media. For example, breaks in resin distribution media may be created in ply drop zones, see example discussed infra. In FIGS. 2 and 3, for example, the resin distribution media (30) is positioned on top of the peel-ply layer (12), which itself is positioned on top of the reinforcement layer (11), although any other desired arrangement is possible. Any distribution layer with greater permeability than the reinforcement layers (11) may be suitable as a resin distribution media (30), although resin distribution media with larger spacings between filaments or more open structures are particularly well-suited (as described below).

Any thickness of resin distribution media may be used, although thinner resin distribution media layers typically offer greater control for infusion with low-viscosity resins. Thicknesses of 1 mm to 4 mm are common, with 1 mm thicknesses preferred for most infusion configurations. The one or more resin distribution media may be the same or different, may be the same or different dimensions (e.g., width, length, thickness, shape, etc.), and may be layered directly on top of, or next to, one another and/or separated by other structure.

Figure 4:
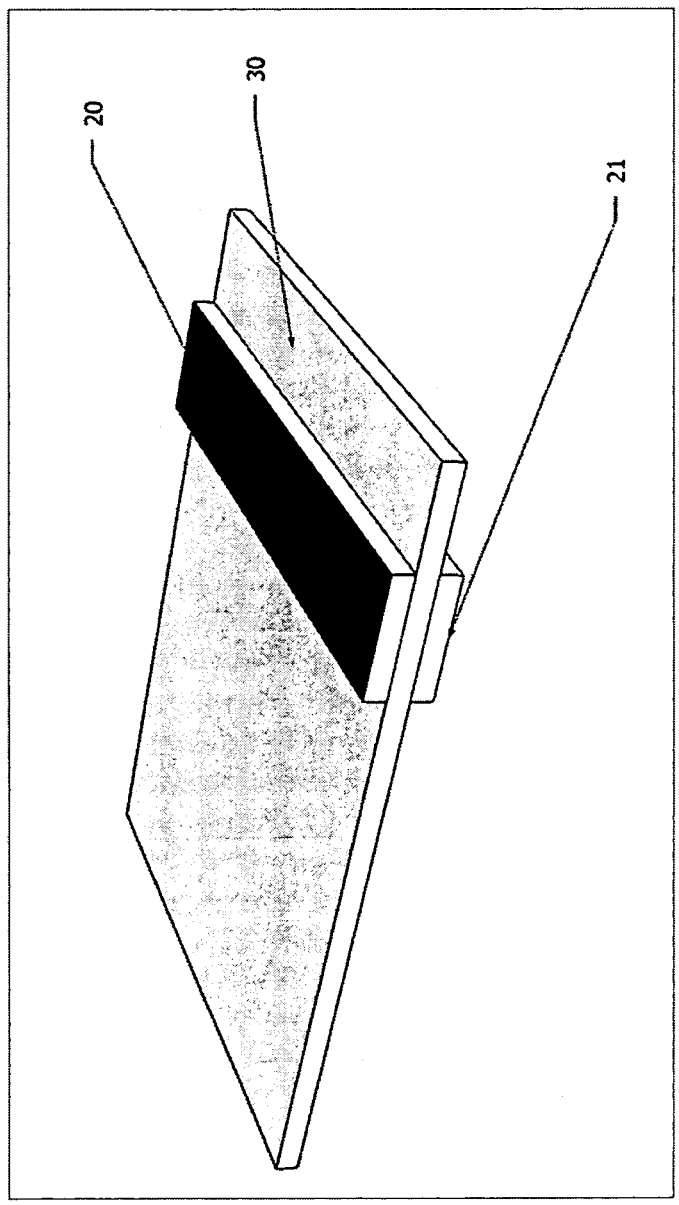
FIG. 4 depicts an exploded view of a resin distribution media and two resin flow control structures of the invention.

In areas where slower resin flow rates are desired in the resin distribution media (30), a first resin flow control structure (21) may be placed below the resin distribution media (30) and the same or different second resin flow control structure (20) may be placed above the resin distribution media (30) to create a resin distribution media with resin flow control structures. The first resin flow control structure (21) and the same or different second resin flow control structure (20) may substantially overlay each other, have the same shape and dimensions, and typically extend across the entire width of the resin distribution media, as shown, for example, in FIG. 4, but they need not substantially overlay each other, have the same shape and/or dimensions, and/or extend across the entire width of the resin distribution media. In other embodiments, the resin distribution media may be positioned to cover the resin flow control structures completely, partially, or not at all. Similarly, in other embodiments, the resin flow control structures may be positioned to cover the resin distribution media completely, partially, or not at all.

Figure 5:
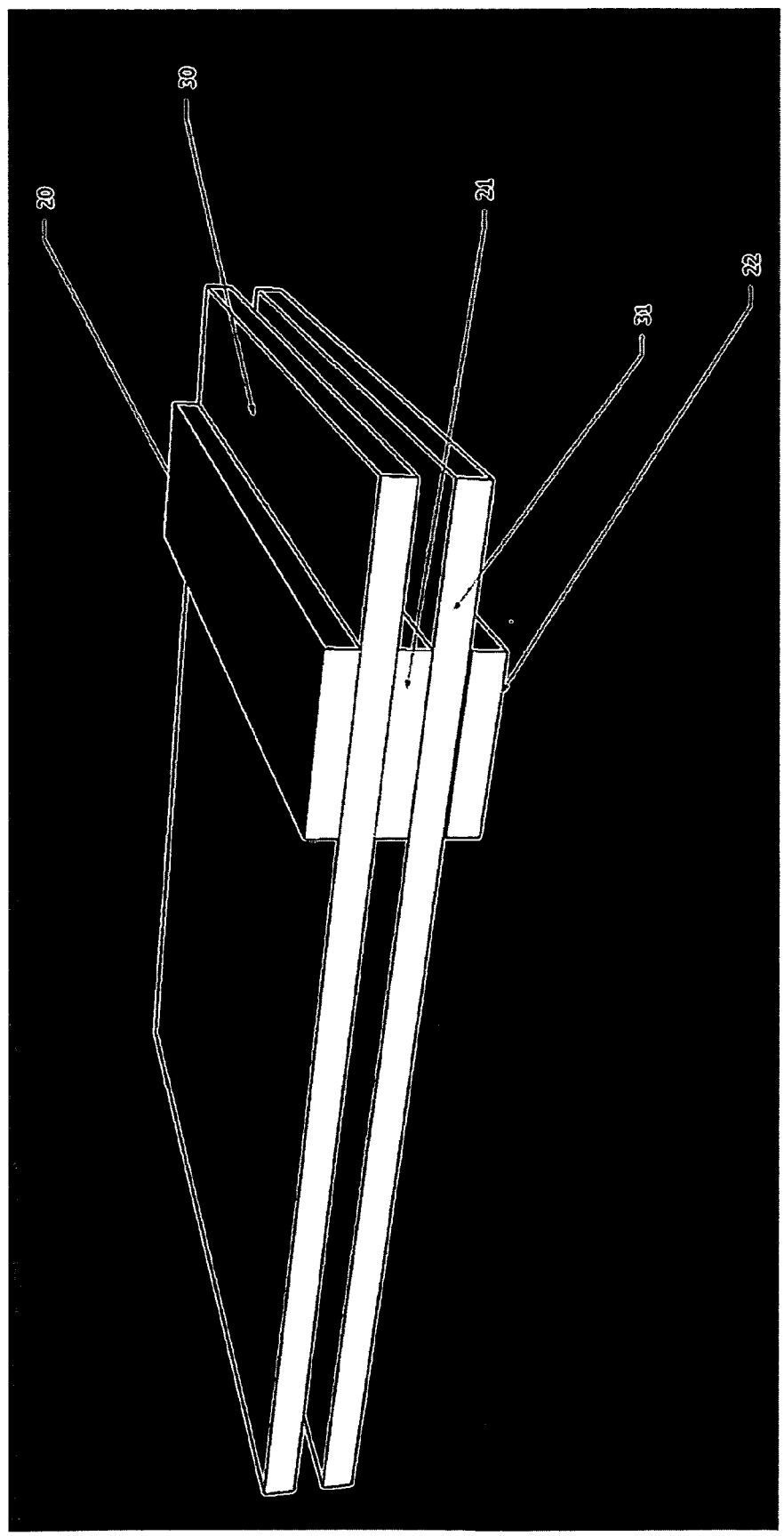
FIG. 5 depicts an exploded view of two resin distribution media and three resin flow control structures of the invention.

In another embodiment, it is possible to use a plurality of resin flow control structures, which may be the same or different, to control the flow rate of resin in one or more resin distribution media. For example, as shown in FIG. 5, a first resin flow control structure (20) may be positioned on the top surface of a first resin distribution media (30), a second resin flow control structure (21), which may be the same or different as the first resin flow control structure (20), may be positioned beneath the first resin flow control structure (20), a second resin distribution media (31), which may be the same or different as the first resin distribution media (30), may then be positioned beneath the second resin flow control structure (21), and a third resin flow control structure (22), which may be the same or different as the first and/or second resin flow control structures (20 and 21), may then be positioned beneath the second resin distribution media (31). Like the resin flow control structures shown in FIG. 4, the first, second, and third resin flow control structures (20, 21, and 22) in FIG. 5 substantially overlay each other, have the same shape and dimensions, and extend across the width of the resin distribution media, but in other embodiments they need not substantially overlay each other, have the same shape and/or dimensions, and/or extend across the width of the resin distribution media. Additional layers of resin distribution media and/or resin flow control structures are possible as well. For example, more than one identical or different resin flow control structure may be positioned on the same resin distribution media plane.

Resin flow control structures of the invention modify the flow rate of the resin through the resin distribution media (30 and 31), slowing resin flow in the resin distribution media (30 and 31) plane, allowing resin flow in the reinforcement layers (11) to create a more uniform flow front with reduced lead-lag between different layers of the infusion.

Figure 6:
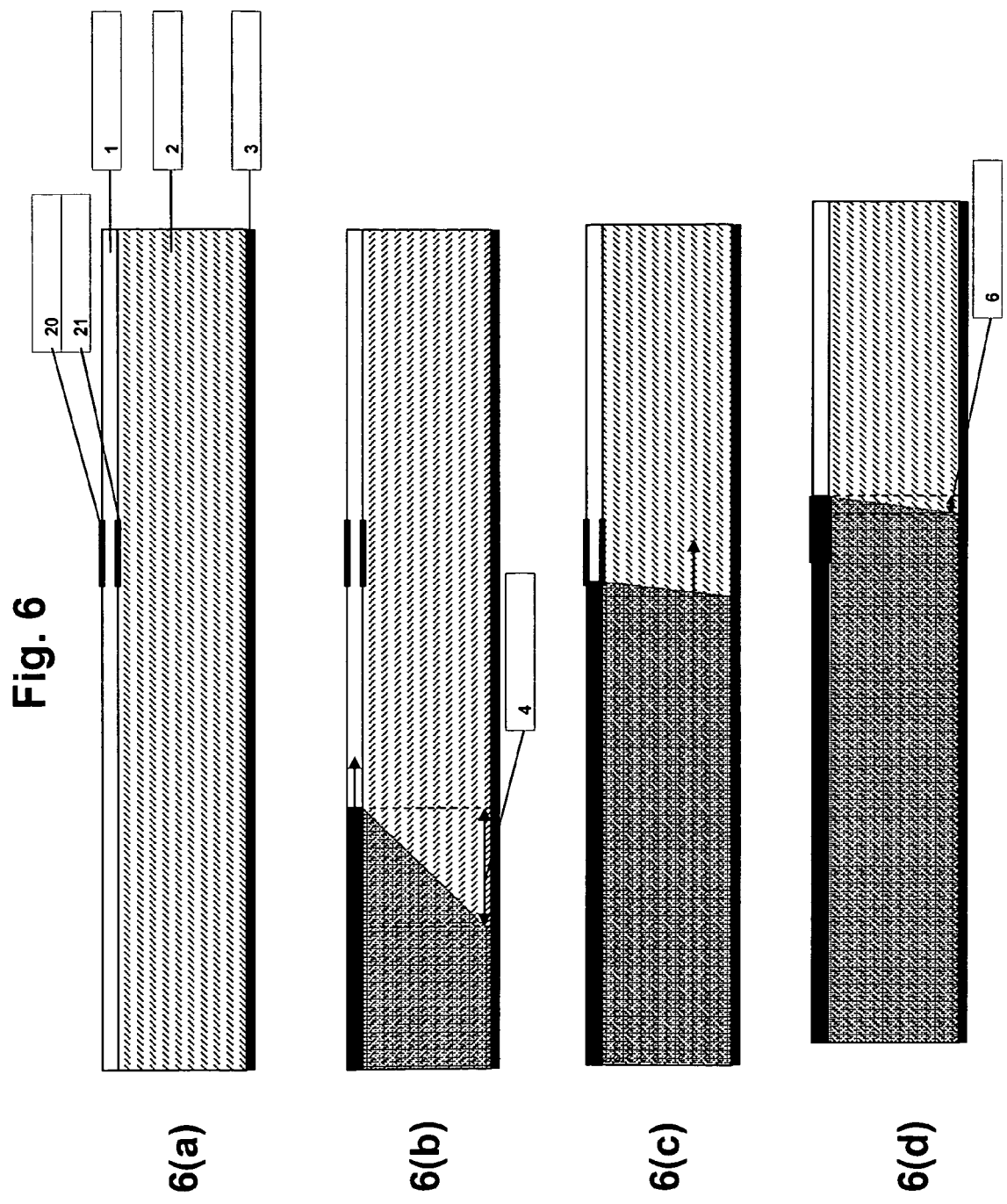
FIG. 6 depicts resin flow through resin distribution media, incorporating resin flow control structures of the invention, into the laminate reinforcement material leading to substantially reduced lead-lag as described herein.

FIG. 6(a)-6(d) depicts the use of resin flow control structures of the invention to control or moderate the flow in the resin distribution media and infusion into the preform reinforcement material. FIGS. 6(a) and 6(b) are identical to previously discussed FIGS. 1(a) and 1(b), other than the inclusion of resin flow control structures (20 and 21) in FIGS. 6(a) and 6(b). As depicted in FIG. 6(c), the resin flow control structures (20 and 21) restrict the resin flow in the resin distribution media (1) (x-y direction) such that the resin flow into the reinforcement layer (2) (z direction) dominates, thereby, substantially reducing the lead-lag (4). The reduction of the lead-lag (6) results in a more substantially uniform resin front that facilitates a more complete resin impregnation of the reinforcement layer (2), as shown in FIG. 6(d).

Resin flow control structures of the invention may be formed out of any material or construction capable of modifying the flow rate of the resin in the resin distribution media. Preferably, the resin flow control structures are gas-permeable to allow for complete evacuation of the preform assembly. Resin flow control structures may be resin-impermeable or resin-permeable. Without wishing to be bound by any particular theory, it is believed that preferred resin flow control structure materials have sufficient thickness, loft, or compressibility such that the when the infusion layup is evacuated, the material of the resin flow control structures partially or fully fills the open structures of the resin distribution media, thereby modifying the flow rate of the resin in the resin distribution media.

Suitable materials for resin flow control structures have sufficient flexibility and/or drapability to conform to simple or complex infusion structures under vacuum. Resin flow control structures may be constructed of any suitable fibers, including nylon, polyester, acrylic, polyamide, natural or other synthetic fibers. The fibers may be of any suitable construction, including nonwovens, chopped-strands, continuous-fibers, felted fabrics, woven fabrics, or combinations thereof. The resin flow control structure material may also contain additional elements, such as honeycomb structures, foam structures, and glass or thermoplastic microspheres.

"Bulking materials" (also known as "bulker mats" or "laminate bulkers") are a class of nonwoven synthetics embedded with microspheres that are particularly suitable as resin flow control structures. Suitable "bulking materials" include Lantor Coremat®, Nida-Core Matline®, and SphereCore SphereTex® products.

Resin flow control structure materials must be of suitable thickness (z-direction) to modify the flow rate of the resin in the resin distribution media. This thickness will depend on both the nature of the resin flow control structure material and the construction of the resin distribution media. In the case of bulking materials, the thickness of the resin flow control structure material typically is at least twice the thickness of the resin distribution media. The thickness may vary in the resin flow control structures themselves. For example, one portion of a resin flow control structure may be 2 mm thick and the other portion may be 1 mm thick. The thickness may taper as well in the resin flow control structures.

Resin flow control structure materials must be of suitable width and/or length (x- or y-direction) to modify the flow rate of the resin in the resin distribution media. Generally speaking, the thicker (z-direction) the preform reinforcement layer, the wider and/or longer (x- or y-direction) the resin flow control structure necessary to modify the flow rate of the resin in the resin distribution media. In one embodiment, for example, the resin flow control structure material has a width and/or length about three times greater than the thickness of the preform reinforcement layer. In other embodiments, the width and/or length of the resin flow control structures may vary in the resin flow control structures themselves. For example, one portion of a resin flow control structure may be 6 mm wide and/or long and the other portion may be 3 mm wide and/or long. The width and/or length may taper as well in the resin flow control structures.

Any variation of thickness, width, and/or length in the resin flow control structure materials that modifies the flow rate of the resin in the resin distribution media makes a resin flow control structure suitable to control the resin flow in the resin distribution media. For example, in one embodiment, the width or length of the resin flow control structures, depending on their orientation to resin flow, extend to the outer edges and/or extend beyond the outer edges of the respective resin distribution media.

The resin flow control structures may be of any geometry, including, for example, rectangular, square, circular, oval, triangular, trapezoidal, etc., or any combination thereof.

The resin flow control structures may be positioned on and/or under the resin distribution media with or without any adhesive. If no adhesive is used, the resin flow control structures may be held in place by, for example, the vacuum bag, which presses down on the resin flow control structures and resin distribution media when a vacuum is drawn on the VARTM mold assembly. Alternatively, or in addition to not using any adhesive, any kind of adhesive known in the art may be used to maintain the position of the resin flow control structures. For example, any pressure-sensitive adhesive or tackifier may be used, including, for example, acrylics, and epoxy-based or polyester-based contact adhesives. Suitable adhesives or tackifiers include, for example, NuTack® E, NuTack® Blu, NidaTack® NT-100, Fusion-Tack, and 3M™ Super 77™.

The resin flow control structures may be positioned in any way necessary to control the infusion of resin into the reinforcement layers. For example, resin flow control structures may, for example, generally be positioned on both sides of the resin distribution media and extend to the outer edges of the resin distribution media to control the flow of resin in the resin distribution media. The position, size, geometry, and dimensions of the resin flow control structures may be varied as well. For example, the resin flow control structures may be positioned in any orientation and in any location on the resin distribution media depending on the direction of resin flow, and need not extend to the outer edges of the resin distribution media in order to control the flow of resin in the resin distribution media.

A resin-impervious material, such as, for example, an air-tight vacuum bagging film (15), is placed over the assembled lay-up and attached to the mold surface (10) by means of a sealant (e.g., Airtech AT® 200 Yellow tape, Aer-Vac LTS® 90B). Suitable vacuum bag (15) materials include, for example, Airtech Stretchlon®, Aerovac Stretchvac®, Aerovac VACFILM® 450V, and others. The vacuum bag (15), together with the mold surface (10), defines the mold assembly, and, once sealed, the mold assembly creates a substantially air-tight cavity (18) around the lay-up. Another resin distribution media (e.g., Enkachannel, Diatex Omega Profile® ACIP50, and common spiral wrap used to bundle wiring) (14) may be used as a supply or feeder channel for the resin. The vacuum bag (15) is equipped with one or more resin inlet ports (16) and one or more vacuum outlet ports (17). In other embodiments, breather clothes, such as non-woven thermoplastics, including, for example, nylon, polyethylene, and polypropylene, may be used. In a typical VARTM infusion, the substantially air-tight cavity (18) is evacuated by means of vacuum applied at vacuum port (17). The resin may be introduced and/or allowed into the assembled lay-up by any way known in the art, including, for example, the pressure differential created by the applied vacuum, such that the resin then flows into the resin distribution media. For example, resin is introduced at the resin inlet port (16), flowing rapidly in the x-y plane due to the resin distribution media (30) and more slowly in the z direction through the reinforcement layers (11). Once infusion is complete, the resin is cured by any known method in the art to form a composite laminate material.

In another embodiment, the resin flow control structures of the invention may be used to control resin flow in resin distribution media in more varied and complex arrangements than those shown in FIG. 2-5. For example, the resin flow control structures may be positioned perpendicular and/or parallel with respect to resin flow from inlet to outlet in laminate assemblies comprising, for example, a plurality of preform reinforcement layers and resin distribution media, each of which may have varied dimensions and may be oriented in any conceivable position. Such a complex arrangement is described in the example below.

Cyclic Olefin

A class of resin compositions that may be used in the method of the invention disclosed herein include one or more cyclic olefins. In general, any cyclic olefin suitable for the metathesis reactions disclosed herein may be used. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a comonomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In general, the cyclic olefin may be represented by the structure of formula (A)

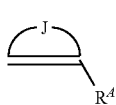

(A)

wherein J and $R^A$ are as follows:

$R^A$ is selected from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphine, sulfonato, $C_1$-$C_{20}$ alkylsulfanyl, $C_5$-$C_{20}$ aryl sulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamide, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylate, mercapto, formyl, $C_1$-$C_{20}$ thioester, cyano, cyanato, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^A$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen, or phosphorus atom, or through an electron-rich metal or metalloid such as Ge, Sn, As, Sb, Se, Te, etc. With such functional groups, there will normally be an intervening linkage $Z^*$, such that $R^A$ then has the structure —$(Z^*)_n$-Fn wherein n is 1, Fn is the functional group, and $Z^*$ is a hydrocarbylene linking group such as an alkylene, substituted alkylene, heteroalkylene, substituted heteroalkene, arylene, substituted arylene, heteroarylene, or substituted heteroarylene linkage. Additionally, functional groups ("Fn") may be thiocyanato, isocyanate, or thioisocyanate.

J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more —$(Z^*)_n$-Fn groups, wherein n is zero or 1, and Fn and $Z^*$ are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefin reactants encompassed by structure (A) may be represented by the structure (B)

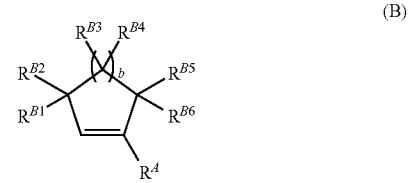

(B)

wherein b is an integer generally although not necessarily in the range of 1 to 10, typically 1 to 5, $R^A$ is as defined above for structure (A), and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and —$(Z^*)_n$-Fn where n, $Z^*$ and Fn are as defined previously, and wherein if any of the $R^{B1}$ through $R^{B6}$ moieties is substituted hydrocarbyl or substituted heteroatom-containing hydrocarbyl, the substituents may include one or more —$(Z^*)_n$-Fn groups. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc. Furthermore, any of the $R^{B1}$, $R^{B2}$, $R^{B3}$, $R^{B4}$, $R^{B5}$, and $R^{B6}$ moieties can be linked to any other of the $R^{B1}$, $R^{B2}$, $R^{B3}$, $R^{B4}$, $R^{B5}$, and $R^{B6}$ moieties to provide a bicyclic or polycyclic olefin, and the linkage may include without limitation heteroatoms or functional groups, e.g., the linkage may include an ether, ester, thioether, amino, alkylamino, imino, or anhydride moiety.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylclooctene, 1,5-dimethylcyclooctene, etc.

Monocyclic diene reactants encompassed by structure (A) may be generally represented by the structure (C)

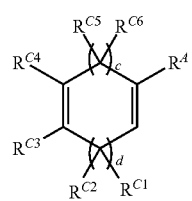

(C)

wherein c and d are independently integers in the range of 1 to about 8, typically 2 to 4, preferably 2 (such that the reactant is a cyclooctadiene), $R^A$ is as defined above for structure (A), and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be non-hydrogen substituents, in which case the second olefinic moiety is tetrasubstituted. Examples of monocyclic diene reactants include, without limitation, 1,3-cyclopentadiene, 1,3-cyclohexadiene, 1,3-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene structure (C), and will generally contain at least one methylene linkage between any two olefinic segments. Additionally, any of the $R^{C1}$, $R^{C2}$, $R^{C3}$, $R^{C4}$, $R^{C5}$, and $R^{C6}$ moieties can be linked to any other of the $R^{C1}$, $R^{C2}$, $R^{C3}$, $R^{C4}$, $R^{C5}$, and $R^{C6}$ moieties to provide a bicyclic or polycyclic olefin, and the linkage may include without limitation heteroatoms or functional groups, e.g., the linkage may include an ether, ester, thioether, amino, alkylamino, imino, or anhydride moiety.

Bicyclic and polycyclic olefinic reactants encompassed by structure (A) may be generally represented by the structure (D)

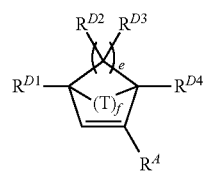

(D)

wherein e is an integer in the range of 1 to 8, typically 2 to 4, f is generally 1 or 2, T is lower alkylene or lower alkenylene, generally substituted or unsubstituted methyl or ethyl, $R^A$ is as defined above for structure (A), and RD1, $R^{D2}$, $R^{D3}$, and $R^{D4}$ are as defined for $R^{B1}$ through $R^{B6}$. Additionally, any of the $R^{D1}$, $R^{D2}$, $R^{D3}$, and $R^{D4}$ moieties can be linked to any other of the $R^{D1}$, $R^{D2}$, $R^{D3}$, and $R^{D4}$ moieties to provide a bicyclic or polycyclic olefin, and the linkage may include heteroatoms or functional groups, e.g., the linkage may include without limitation an ether, ester, thioether, amino, alkylamino, imino, or anhydride moiety.

Preferred olefinic reactants encompassed by structure (D) are in the norbornene family, having the general structure (E)

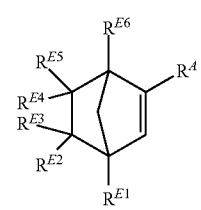

(E)

wherein $R^A$ is as defined above, $R^{E1}$, $R^{E2}$, $R^{E3}$, and $R^{E6}$ have the same definitions as $R^{B1}$ through $R^{B6}$, and $R^{E4}$ and $R^{E5}$ are defined as for $R^{E2}$ and $R^{E3}$, respectively. Additionally, any of the $R^{E1}$, $R^{E2}$, $R^{E3}$, $R^{E4}$, $R^{E5}$, and $R^{E6}$ moieties can be linked to any other of the $R^{E1}$, $R^{E2}$, $R^{E3}$, $R^{E4}$, $R^{E5}$, and $R^{E6}$ moieties to provide a bicyclic or polycyclic olefin, and the linkage may include heteroatoms or functional groups, e.g., the linkage may include without limitation an ether, ester, thioether, amino, alkylamino, imino, or anhydride moiety.

Examples of bicyclic and polycyclic olefinic reactants thus include, without limitation, dicyclopentadiene, tricyclopentadiene, dicyclohexadiene, norbornene, 5-methyl-2-norbornene, 5-ethyl-2-norbornene, 5-isobutyl-2-norbornene, 5,6-dimethyl-2-norbornene, 5-phenylnorbornene, 5-benzylnorbornene, 5-acetylnorbornene, 5-methoxycarbonylnorbornene, 5-ethoxycarbony-1-norbornene, 5-methyl-5-methoxy-carbonylnorbornene, 5-cyanonorbornene, 5,5,6-trimethyl-2-norbornene, cyclo-hexenylnorbornene, endo, exo-5,6-dimethoxynorbornene, endo, endo-5,6-dimethoxynorbornene, endo,exo-5,6-dimethoxycarbonylnorbornene, endo, endo-5,6-dimethoxycarbonylnorbornene, 2,3-dimethoxynorbornene, norbornadiene, tricycloundecene, tetracyclododecene, 8-methyltetracyclododecene, 8-ethyl-tetracyclododecene, 8-methoxycarbonyltetracyclododecene, 8-methyl-8-tetracyclo-dodecene, 8-cyanotetracyclododecene, pentacyclopentadecene, pentacyclohexadecene, and the like. Additionally, the aforementioned bicyclic and polycyclic olefinic reactants include their stereoisomers and mixtures thereof.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous O heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include without limitation cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Preferred examples of cyclic olefins that comprise multiple rings include norbornene, dicyclopentadiene, and 5-ethylidene-2-norbornene.

The cyclic olefin may also be substituted, for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., Protective Groups in Organic Synthesis, 3$^{rd}$ Ed. (New York: Wiley, 1999). Examples of functionalized cyclic olefins include without limitation 2-hydroxymethyl-5-norbornene, 2-[(2-hydroxyethyl)carboxylate]-5-norbornene, cydecanol, 5-n-hexyl-2-norbornene, 5-n-butyl-2-norbornene.

Cyclic olefins incorporating any combination of the abovementioned features (i.e., heteroatoms, substituents, multiple olefins, multiple rings) are suitable for the methods disclosed herein.

The cyclic olefins useful in the methods disclosed herein may be strained or unstrained. It will be appreciated that the amount of ring strain varies for each cyclic olefin compound, and depends upon a number of factors including the size of the ring, the presence and identity of substituents, and the presence of multiple rings. Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive. In some cases, ring opening reactions of relatively unstrained (and therefore relatively unreactive) cyclic olefins may become possible when performed in the presence of the olefinic compounds disclosed herein.

A plurality of cyclic olefins may be used to prepare metathesis polymers from the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and polymers formed.

Olefin Metathesis Catalysts

The olefin metathesis catalyst complex that may be present in the resins used in the method of the invention disclosed herein, is preferably a Group 8 transition metal complex having the structure of formula (I)

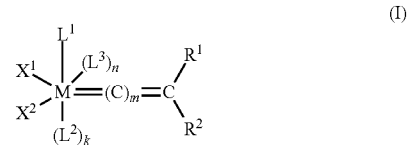

in which:
M is a Group 8 transition metal;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Preferred catalysts contain Ru or Os as the Group 8 transition metal, with Ru particularly preferred.

Numerous embodiments of the catalysts useful in the reactions disclosed herein are described in more detail infra. For the sake of convenience, the catalysts are described in groups, but it should be emphasized that these groups are not meant to be limiting in any way. That is, any of the catalysts useful in the invention may fit the description of more than one of the groups described herein.

A first group of catalysts, then, are commonly referred to as First Generation Grubbs-type catalysts, and have the structure of formula (I). For the first group of catalysts, M is a Group 8 transition metal and m is 0, 1 or 2, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine and thioether. Exemplary ligands are trisubstituted phosphines of the formula $PR^{H1}R^{H2}R^{H3}$, where $R^{H1}$, $R^{H2}$, and $R^{H3}$ are each independently aryl or $C_1$-$C_{10}$ alkyl, particularly primary alkyl, secondary alkyl, or cycloalkyl. In the most preferred embodiments, $L^1$ and $L^2$ are independently selected from the group consisting of trimethylphosphine (Pme$_3$), triethylphosphine (PEt$_3$), tri-n-butylphosphine (Pbu$_3$), tri(ortho-tolyl)phosphine (P-o-tolyl$_3$), tri-tert-butylphosphine (P-tert-Bu$_3$), tricyclopentylphosphine (Pcyclopentyl$_3$), tricyclohexylphosphine (Pcy$_3$), triisopropylphosphine (P-i-Pr$_3$), triisobutylphosphine, trioctylphosphine (Poct$_3$), triphenylphosphine (PPh$_3$), tri(pentafluorophenyl)phosphine (P(C$_6$F5)$_3$), methyldiphenylphosphine (PmePh$_2$), dimethylphenylphosphine (Pme$_2$Ph), and diethylphenylphosphine (PEt$_2$Ph).

Alternatively L$^1$ and L$^2$ are independently selected from phosphabicycloalkane (e.g. monosubstituted 9-phosphabicyclo-[3.3.1]nonane, or monosubstituted 9-phosphabicyclo [4.2.1]nonane] such as cyclohexylphoban, isopropylphoban, ethylphoban, methylphoban, butylphoban, pentylphoban and the like).

X$^1$ and X$^2$ are anionic ligands, and may be the same or different, or are linked together to form a cyclic group, typically although not necessarily a five- to eight-membered ring. In preferred embodiments, X$^1$ and X$^2$ are each independently hydrogen, halide, or one of the following groups: C$_1$-C$_{20}$ alkyl, C$_5$-C$_{24}$ aryl, C$_1$-C$_{20}$ alkoxy, C$_5$-C$_{24}$ aryloxy, C$_2$-C$_{20}$ alkoxycarbonyl, C$_6$-C$_{24}$ aryloxycarbonyl, C$_2$-C$_{24}$ acyl, C$_2$-C$_{24}$ acyloxy, C$_1$-C$_{20}$ alkylsulfonato, C$_5$-C$_{24}$ arylsulfonato, C$_1$-C$_{20}$ alkylsulfanyl, C$_5$-C$_{24}$ arylsulfanyl, C$_1$-C$_{20}$ alkylsulfinyl, or C$_5$-C$_{24}$ arylsulfinyl. Optionally, X$^1$ and X$^2$ may be substituted with one or more moieties selected from C$_1$-C$_{12}$ alkyl, C$_1$-C$_{12}$ alkoxy, C$_5$-C$_{24}$ aryl, and halide, which may, in turn, with the exception of halide, be further substituted with one or more groups selected from halide, C$_1$-C$_6$ alkyl, C$_1$-C$_6$ alkoxy, and phenyl. In more preferred embodiments, X$^1$ and X$^2$ are halide, benzoate, C$_2$-C$_6$ acyl, C$_2$-C$_6$ alkoxycarbonyl, C$_1$-C$_6$ alkyl, phenoxy, C$_1$-C$_6$ alkoxy, C$_1$-C$_6$ alkylsulfanyl, aryl, or C$_1$-C$_6$ alkylsulfonyl. In even more preferred embodiments, X$^1$ and X$^2$ are each halide, CF$_3$CO$_2$, CH$_3$CO$_2$, CFH$_2$CO$_2$, (CH$_3$)$_3$CO, (CF$_3$)$_2$(CH$_3$)CO, (CF$_3$)(CH$_3$)$_2$CO, PhO, MeO, EtO, tosylate, mesylate, or trifluoromethane-sulfonate. In the most preferred embodiments, X$^1$ and X$^2$ are each chloride. Alternatively X$^1$ and X$^2$ are independently NO$_3$, —N=C=O, or —N=C=S.

R$^1$ and R$^2$ are independently selected from hydrogen, hydrocarbyl (e.g., C$_1$-C$_{20}$ alkyl, C$_2$-C$_{20}$ alkenyl, C$_2$-C$_{20}$ alkynyl, C$_5$-C$_{24}$ aryl, C$_6$-C$_{24}$ alkaryl, C$_6$-C$_{24}$ aralkyl, etc.), substituted hydrocarbyl (e.g., substituted C$_1$-C$_{20}$ alkyl, C$_2$-C$_{20}$ alkenyl, C$_2$-C$_{20}$ alkynyl, C$_5$-C$_{24}$ aryl, C$_6$-C$_{24}$ alkaryl, C$_6$-C$_{24}$ aralkyl, etc.), heteroatom-containing hydrocarbyl (e.g., heteroatom-containing C$_1$-C$_{20}$ alkyl, C$_2$-C$_{20}$ alkenyl, C$_2$-C$_{20}$ alkynyl, C$_5$-C$_{24}$ aryl, C$_6$-C$_{24}$ alkaryl, C$_6$-C$_{24}$ aralkyl, etc.), and substituted heteroatom-containing hydrocarbyl (e.g., substituted heteroatom-containing C$_1$-C$_{20}$ alkyl, C$_2$-C$_{20}$ alkenyl, C$_2$-C$_{20}$ alkynyl, C$_5$-C$_{24}$ aryl, C$_6$-C$_{24}$ alkaryl, C$_6$-C$_{24}$ aralkyl, etc.), and functional groups. R$^1$ and R$^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, R$^1$ is hydrogen and R$^2$ is selected from C$_1$-C$_{20}$ alkyl, C$_2$-C$_{20}$ alkenyl, and C$_5$-C$_{24}$ aryl, more preferably C$_1$-C$_6$ alkyl, C$_2$-C$_6$ alkenyl, and C$_5$-C$_{14}$ aryl. Still more preferably, R$^2$ is phenyl, vinyl, methyl, isopropyl, or t-butyl, optionally substituted with one or more moieties selected from C$_1$-C$_6$ alkyl, C$_1$-C$_6$ alkoxy, phenyl, and a functional group Fn as defined earlier herein. Most preferably, R$^2$ is phenyl or vinyl substituted with one or more moieties selected from methyl, ethyl, chloro, bromo, iodo, fluoro, nitro, dimethylamino, methyl, methoxy, and phenyl. Optimally, R$^2$ is phenyl or —C=C(CH$_3$)$_2$.

Any two or more (typically two, three, or four) of X$^1$, X$^2$, L$^1$, L$^2$, L$^3$, R$^1$, and R$^2$ can be taken together to form a cyclic group, including bidentate or multidentate ligands, as disclosed, for example, in U.S. Pat. No. 5,312,940, the disclosure of which is incorporated herein by reference. When any of X$^1$, X$^2$, L$^1$, L$^2$, L$^3$, R$^1$, and R$^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as Second Generation Grubbs-type catalysts, have the structure of formula (I), wherein L$^1$ is a carbene ligand having the structure of formula (II)

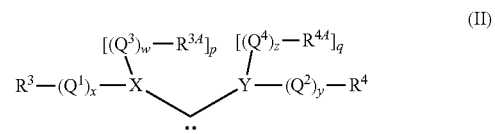

(II)

such that the complex may have the structure of formula (III)

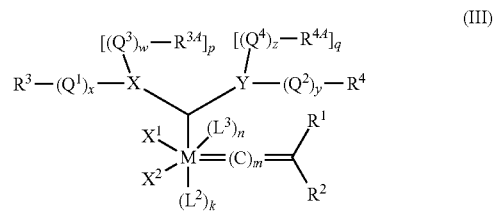

(III)

wherein M, m, n, X$^1$, X$^2$, L$^2$, L$^3$, R$^1$, and R$^2$ are as defined for the first group of catalysts, and the remaining substituents are as follows;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

Q$^1$, Q$^2$, Q$^3$, and Q$^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within Q$^1$, Q$^2$, Q$^3$, and Q$^4$ may be linked to form an additional cyclic group; and R$^3$, R$^{3A}$, R$^4$, and R$^{4A}$ are independently selected from hydrogen, hydrocarbyl, substituted hydrocarbyl, heteroatom-containing hydrocarbyl, and substituted heteroatom-containing hydrocarbyl.

In addition, any two or more of X$^1$, X$^2$, L$^1$, L$^2$, L$^3$, R$^1$, R$^2$, R$^3$, R$^{3A}$, R$^4$, and R$^{4A}$ can be taken together to form a cyclic group, and any one or more of X$^1$, X$^2$, L$^2$, L$^3$, Q$^1$, Q$^2$, Q$^3$, Q$^4$, R$^1$, R$^2$, R$^3$, R$^{3A}$, R$^4$, and R$^{4A}$ may be attached to a support. Any two or more of X$^1$, X$^2$, L$^1$, L$^2$, L$^3$, R$^1$, R$^2$, R$^3$, R$^{3A}$, R$^4$, and R$^{4A}$ can also be taken to be -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/ or functional groups may be present in either the aryl or the alkyl portions of the alkylene and arylalkylene groups, and Fn is a functional group, or together to form a cyclic group, and any one or more of $X^1$, $X^2$, $L^2$, $L^3$, Q, $Q^2$, $Q^3$, $Q^4$, $R^1$, $R^2$, $R^3$, $R^{3A}$, $R^4$, and $R^{4A}$ may be attached to a support.

Preferably, $R^{3A}$ and $R^{4A}$ are linked to form a cyclic group so that the carbene ligand has the structure of formula (IV)

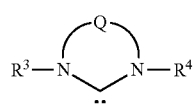

(IV)

wherein $R^3$ and $R^4$ are as defined for the second group of catalysts above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene (NHC) ligands and acyclic diaminocarbene ligands suitable as $L^1$ thus include, but are not limited to, the following where DIPP is diisopropylphenyl and Mes is 2,4,6-trimethylphenyl:

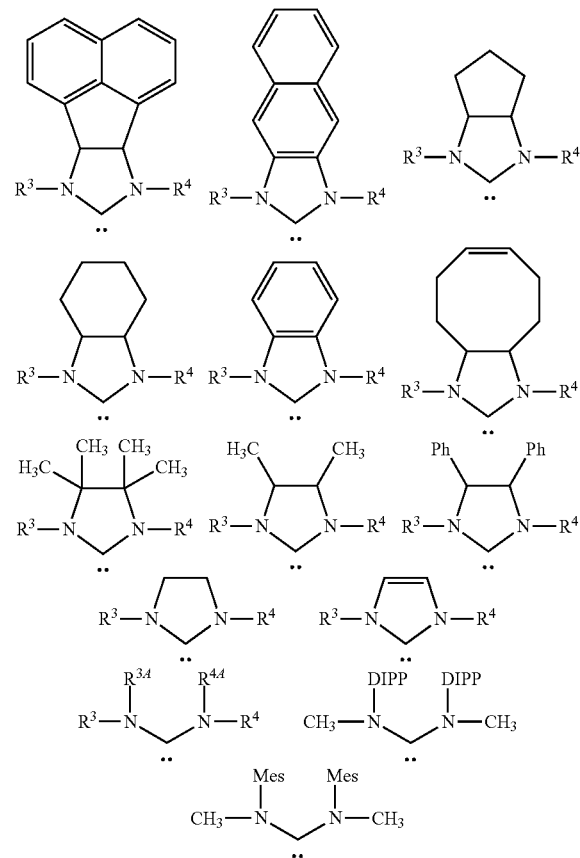

Additional examples of N-heterocyclic carbene (NHC) ligands and acyclic diaminocarbene ligands suitable as $L^1$ thus include, but are not limited to the following:

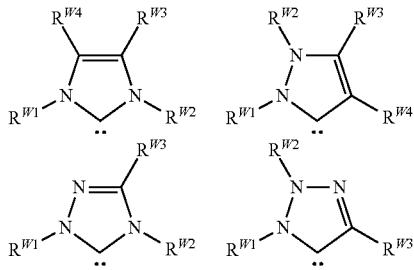

wherein $R^{W1}$, $R^{W2}$, $R^{W3}$, $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups.

Additional examples of N-heterocyclic carbene (NHC) ligands suitable as $L^1$ are further described in U.S. Pat. Nos. 7,378,528; 7,652,145; 7,294,717; 6,787,620; 6,635,768; and 6,552,139 the disclosures of which are incorporated herein by reference. Additionally, thermally activated N-Heterocyclic Carbene Precursors as disclosed in U.S. Pat. No. 6,838,489 the contents of which is incorporated herein by reference, may also be used with the present invention.

When M is ruthenium, then the preferred complexes have the structure of formula (V)

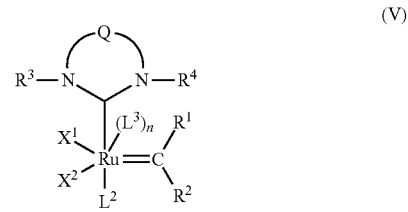

(V)

In a more preferred embodiment, Q is a two-atom linkage having the structure —$CR^{11}R^{12}$—$CR^{13}R^{14}$— or —$CR^{11}$=$CR^{13}$—, preferably —$CR^{11}R^{12}$—$CR^{13}R^{14}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include without limitation carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents. In one further aspect, any one or more of $R^{11}$, $R^{12}$, $R^{13}$, and $R^{14}$ comprises one or more of the linkers. Additionally, $L^2$ may be $L^2_{(k)}$, wherein k is zero or 1.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl (i.e., Mes as defined herein).

In a third group of catalysts having the structure of formula (I), M, m, n, $X^1$, $X^2$, $R^1$, and $R^2$ are as defined for the first group of catalysts, $L^1$ is a strongly coordinating neutral electron donor ligand such as any of those described for the first and second group of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VI)

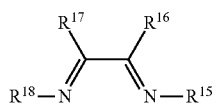

(VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As(Ph)$_2$CH$_2$CH$_2$As(Ph$_2$)-, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$— and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)(CH$_2$)$_2$CO$_2$, phthalocyanines, and porphyrins.

Complexes wherein Y is coordinated to the metal are examples of a fifth group of catalysts, and are commonly called "Grubbs-Hoveyda" catalysts. Grubbs-Hoveyda metathesis-active metal carbene complexes may be described by the formula (VII)

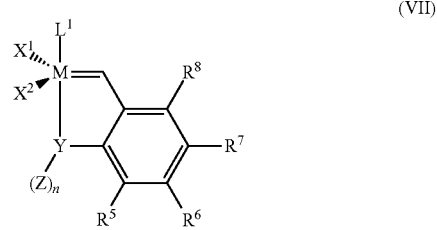

(VII)

wherein,

M is a Group 8 transition metal, particularly Ru or Os, or, more particularly, Ru;

$X^1$, $X^2$, and $L^1$ are as previously defined herein for the first and second groups of catalysts;

Y is a heteroatom selected from N, O, S, and P; preferably Y is O or N;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support.

Additionally, $R^5$, $R^6$, $R^7$, and $R^8$ are each, independently selected from the group consisting of thioisocyanate, cyananto, or thiocyanato. Additionally, Z may be independently selected from thioisocyanate, cyanato, or thiocyanato.

Additionally Z may independently be thioisocyanate, cyanato, or thiocyanato.

In general, Grubbs-Hoveyda complexes useful in the invention contain a chelating alkylidene moiety of the formula (VIII)

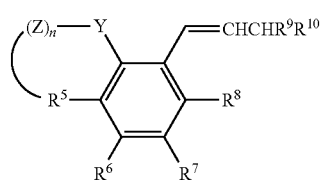

(VIII)

wherein Y, n, Z, $R^5$, $R^6$, $R^7$, and $R^8$ are as previously defined herein for catalysts of the fifth group;

Y, Z, and $R^5$ can optionally be linked to form a cyclic structure; and $R^9$ and $R^{10}$ are each, independently, selected from hydrogen or a substituent group selected from alkyl, aryl, alkoxy, aryloxy, $C_2$-$C_{20}$ alkoxycarbonyl, or $C_1$-$C_{20}$ trialkylsilyl, wherein each of the substituent groups is substituted or unsubstituted; and wherein any combination or combinations of Z, Y, $R^5$, $R^6$, $R^7$, $R^8$, $R^9$, and $R^{10}$ may be linked to a support.

Examples of complexes comprising Grubbs-Hoveyda ligands suitable in the invention include:

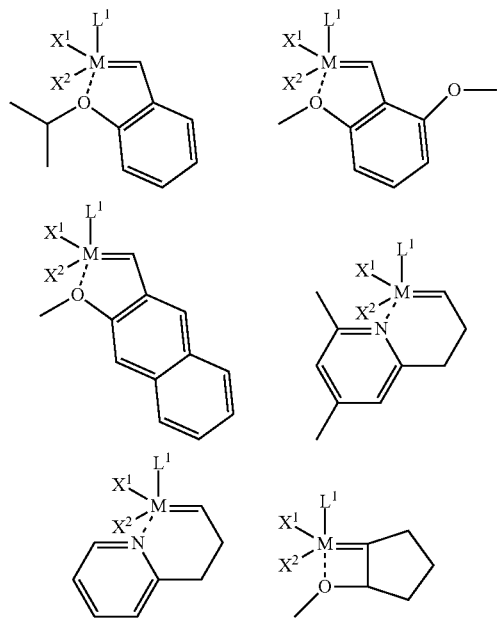

wherein, $L^1$, $X^1$, $X^2$, and M are as described for any of the other groups of catalysts. Suitable chelating carbenes and carbene precursors are further described by Pederson et al. (U.S. Pat. Nos. 7,026,495 and 6,620,955, the disclosures of both of which are incorporated herein by reference) and Hoveyda et al. (U.S. Pat. No. 6,921,735 and WO0214376, the disclosures of both of which are incorporated herein by reference).

Other useful complexes include structures wherein $L^2$ and $R^2$ according to formulae (I), (III), or (V) are linked, such as styrenic compounds that also include a functional group for attachment to a support. Examples in which the functional group is a trialkoxysilyl functionalized moiety include, but are not limited to, the following:

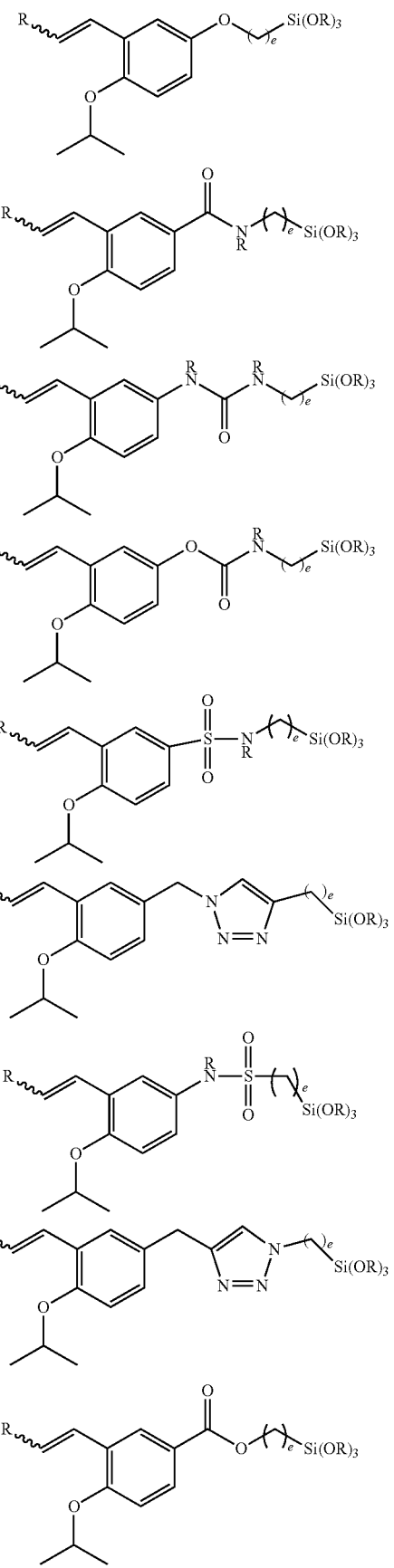

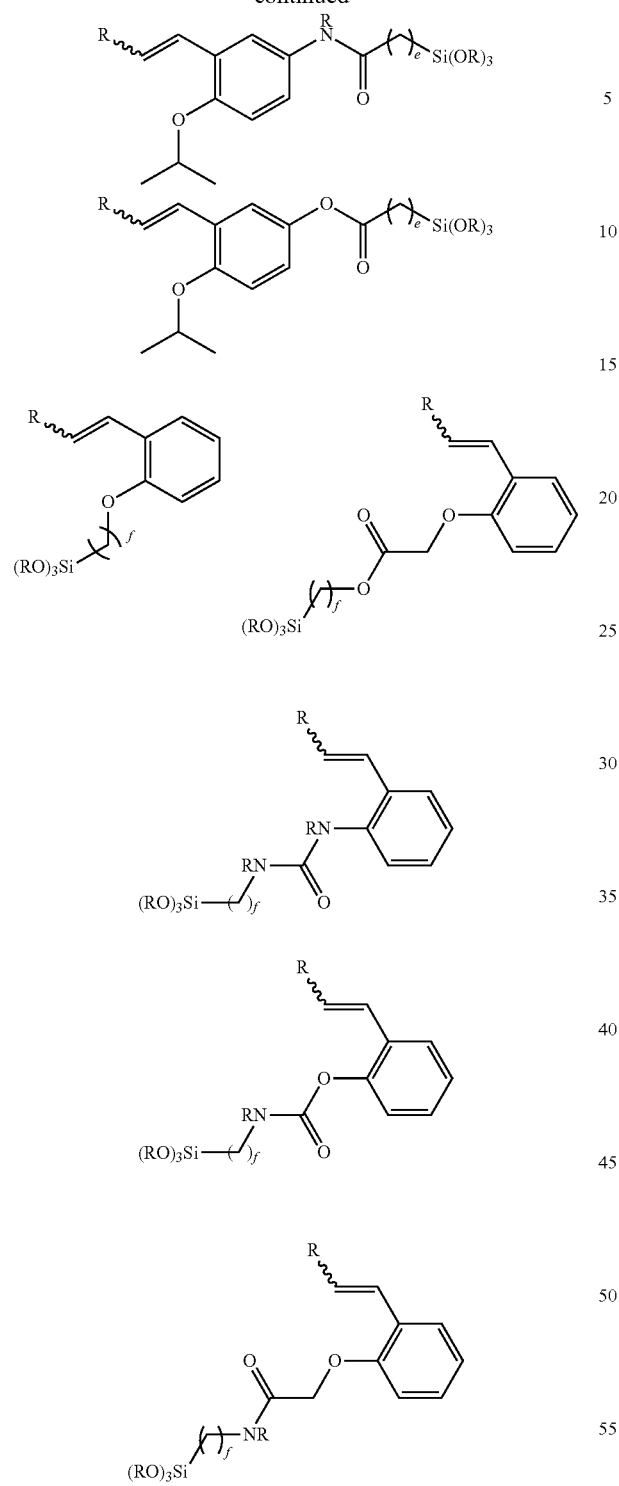
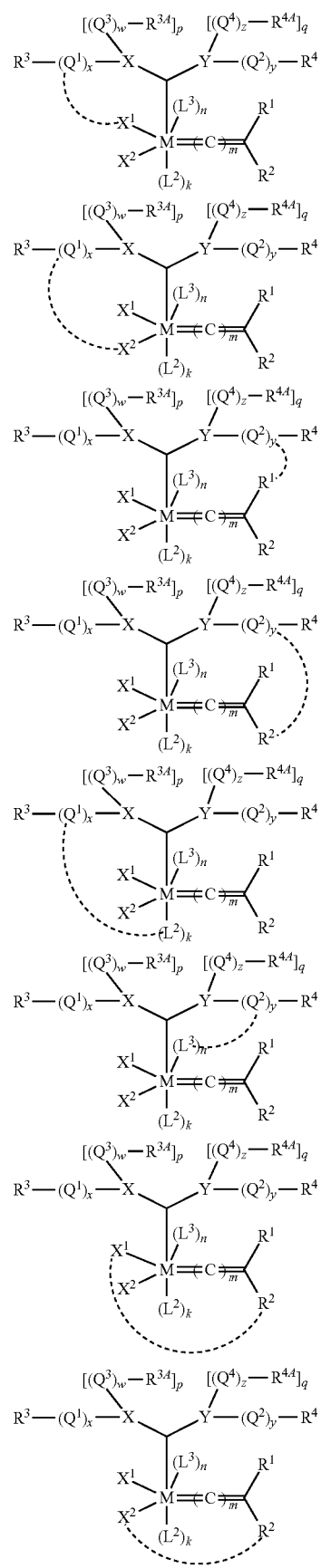

Further examples of complexes having linked ligands include those having linkages between a neutral NHC ligand and an anionic ligand, a neutral NHC ligand and an alkylidine ligand, a neutral NHC ligand and an $L^2$ ligand, a neutral NHC ligand and an $L^3$ ligand, an anionic ligand and an alkylidine ligand, and any combination thereof. While the possible structures are too numerous to list herein, some suitable structures based on formula (III) include:

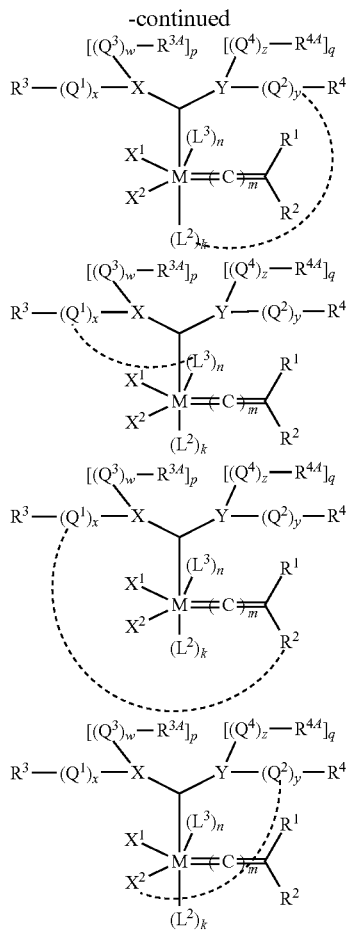

In addition to the catalysts that have the structure of formula (I), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula ($X^1$); and cationic ruthenium or osmium metal carbene complexes containing metal centers that are formally in the +2 oxidation state, have an electron count of 14 or 16, are tetra-coordinated or penta-coordinated, respectively, and are of the general formula (XII)

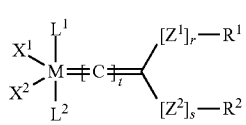
(IX)

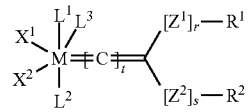
(X)

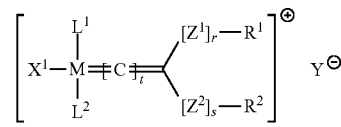
(XI)

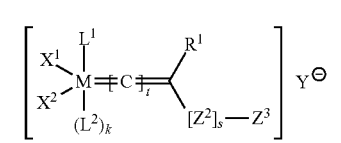
(XII)

wherein:

M, $X^1$, $X^2$, $L^1$, $L^2$, $L^3$, $R^1$, and $R^2$ are as defined for any of the previously defined four groups of catalysts;

r and s are independently zero or 1;

t is an integer in the range of zero to 5;

k is an integer in the range of zero to 1;

Y is any non-coordinating anion (e.g., a halide ion, $BF_4^-$, etc.);

$Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, —S(=O)$_2$;

$Z^3$ is any cationic moiety such as —P($R^2$)$_3^+$ or —N($R^2$)$_3^+$; and any two or more of $X^1$, $X^2$, $L^1$, $L^2$, $L^3$, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, $L^3$, $Z^1$, $Z^2$, $Z^3$, $R^1$, and $R^2$ may be attached to a support. $Z^1$ and $Z^2$ may also be an optionally substituted and/or optionally heteroatom-containing $C_1$-$C_{20}$ hydrocarbylene linkage.

Additionally, another group of olefin metathesis catalysts that may be used in the invention disclosed herein, is a Group 8 transition metal complex having the structure of formula (XIII)

(XIII)

wherein M is a Group 8 transition metal, particularly ruthenium or osmium, or more particularly, ruthenium; $X^1$, $X^2$, $L^1$ and $L^2$ are as defined for the first and second groups of catalysts defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group, or any one or more of the $R^{G1}$, $R^{G2}$, $R^{G3}$, $R^{G4}$, $R^{G5}$, and $R^{G6}$ may be attached to a support.

Additionally, one preferred embodiment of the Group 8 transition metal complex of formula XIII is a Group 8 transition metal complex of formula XIV:

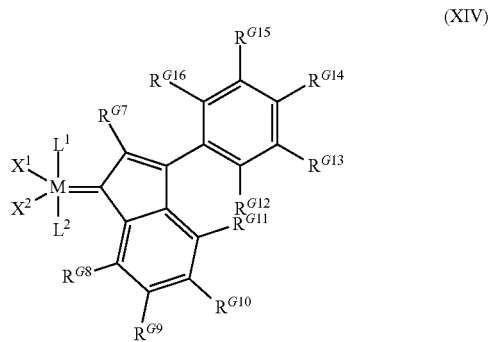

(XIV)

wherein M, $X^1$, $X^2$, $L^1$, $L^2$, are as defined above for Group 8 transition metal complex of formula XIII; and $R^{G7}$, $R^{G8}$, $R^{G9}$, $RG^{10}$, $R^{G11}$, $R^{G12}$, $RG^{13}$, $RG^{14}$, $RG^{15}$ and $R^{G16}$ are as defined above for $R^{G1}$, $R^{G2}$, $R^{G3}$, $R^{G4}$, $R^{G5}$, and $R^{G6}$ for Group 8 transition metal complex of formula XIII or any one or more of the $R^{G7}$, $R^{G8}$, $R^{G9}$, $RG^{10}$, $R^{G11}$, $R^{G12}$, $R^{G13}$, $R^{G14}$, $RG^{15}$ and $RG^{16}$ may be linked together to form a cyclic group, or any one or more of the $R^{G7}$, $R^{G8}$, $R^{G9}$, $R^{G10}$, $RG^{11}$, $R^{G12}$, $R^{G13}$, $RG^{14}$, $RG^{15}$ and $R^{G16}$ may be attached to a support.

Additionally, another preferred embodiment of the Group 8 transition metal complex of formula XIII is a Group 8 transition metal complex of formula XV:

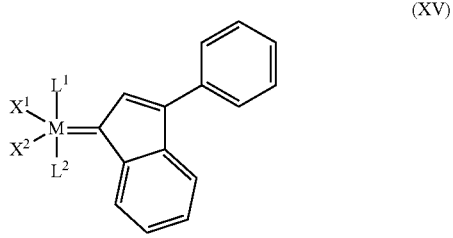

(XV)

wherein M, $X^1$, $X^2$, $L^1$, $L^2$, are as defined above for Group 8 transition metal complex of formula XIII.

Additionally, another group of olefin metathesis catalysts that may be used in the invention disclosed herein, is a Group 8 transition metal complex having the structure of formula (XVI):

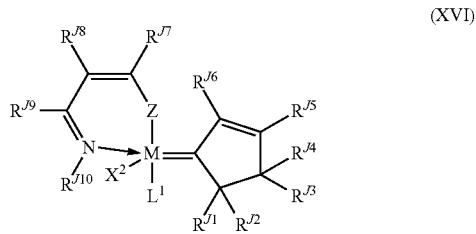

(XVI)

wherein M is a Group 8 transition metal, particularly ruthenium or osmium, or more particularly, ruthenium; $X^1$, and $L^1$ are as defined for the first and second groups of catalysts defined above; Z is selected from the group consisting of oxygen, sulfur, selenium, $NR^{J11}$, $PR^{J11}$, $AsR^{J11}$, and $SbR^{J11}$; and $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be linked together to form a cyclic group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be attached to a support.

Additionally, one preferred embodiment of the Group 8 transition metal complex of formula XVI is a Group 8 transition metal complex of formula XVII:

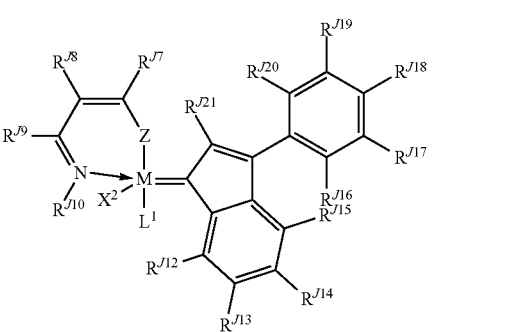

(XVII)

wherein M, $X^1$, $L^1$, Z, $R^{J7}$, $R^{J8}$, $R^{J9}$, $R^{J10}$, and $R^{J11}$ are as defined above for Group 8 transition metal complex of formula XVI; and $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ are as defined above for $R^{J1}$, $R^{J2}$, $R^{J3}$, $R^{J4}$, $R^{J5}$, and $R^{J6}$ for Group 8 transition metal complex of formula XVI, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be linked together to form a cyclic group, or any one or more of the $R^{J7}$, $R^{J8}$, $R^{J9}$, $R^{J10}$, $RJ^{11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be attached to a support.

Additionally, another preferred embodiment of the Group 8 transition metal complex of formula XVI is a Group 8 transition metal complex of formula XVIII:

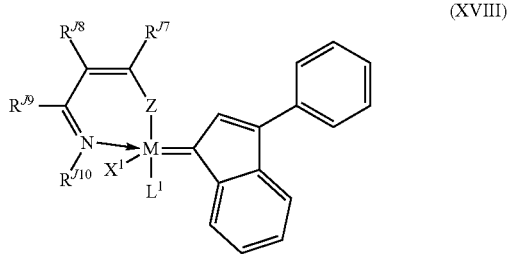

(XVIII)

wherein M, $X^1$, $L^1$, Z, $R^{J7}$, $R^{J8}$, $R^{J9}$, $R^{J10}$, and $R^{J11}$, are as defined above for Group 8 transition metal complex of formula XVI.

Additionally, another group of olefin metathesis catalysts that may be used in the invention disclosed herein, is a Group 8 transition metal complex having the structure of formula (XIX):

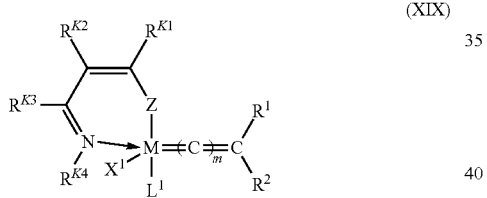

(XIX)

wherein M is a Group 8 transition metal, particularly ruthenium or osmium, or more particularly, ruthenium; $X^1$, $L^1$, $R^1$, and $R^2$ are as defined for the first and second groups of catalysts defined above; Z is selected from the group consisting of oxygen, sulfur, selenium, $NR^{K5}$, $PR^{K5}$, $AsR^{K5}$, and $SbR^{K5}$; m is 0, 1, or 2; and $R^{K1}$, $R^{K2}$, $R^{K3}$, $R^{K4}$, and $R^{K5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group, or any one or more of the $R^{K1}$, $R^{K2}$, $R^{K3}$, $R^{K4}$, and $R^{K5}$ may be attached to a support.

In addition, other examples of catalysts that may be used with the present invention are located in the following disclosures, each of which is incorporated herein by reference, U.S. Pat. Nos. 7,687,635; 7,671,224 and 5,977,393; International Publication Number WO2010/037550; and U.S. patent application Ser. Nos. 12/303,615; 10/590,380; 11/465,651 (Publication Number: US 2007/0043188); and Ser. No. 11/465,651 (Publication Number: US 2008/0293905 Corrected Publication).

Non-limiting examples of catalysts that may be used to prepare supported complexes and in the reactions disclosed herein include the following, some of which for convenience are identified throughout this disclosure by reference to their molecular weight:

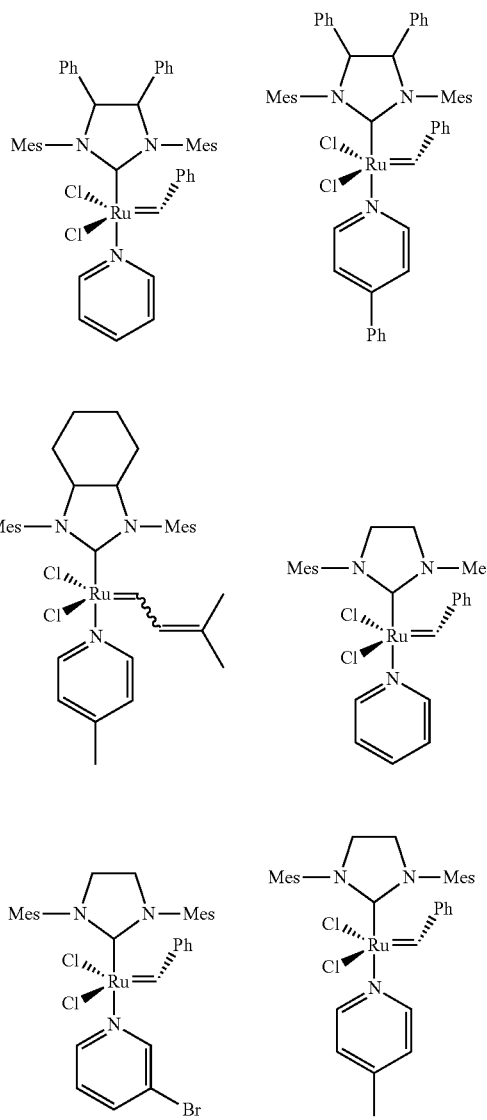

-continued
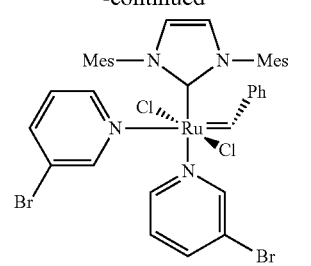
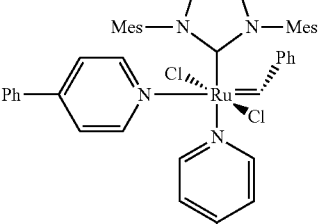
C884
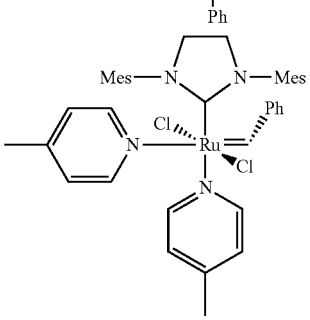
C727
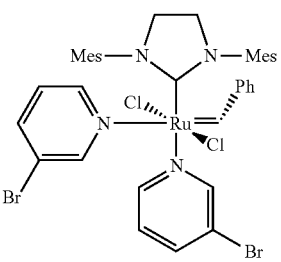
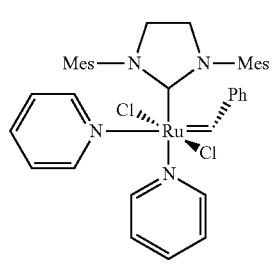
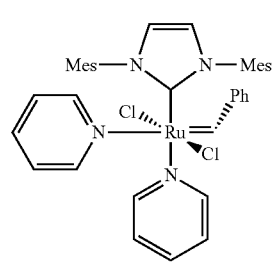
-continued
C827
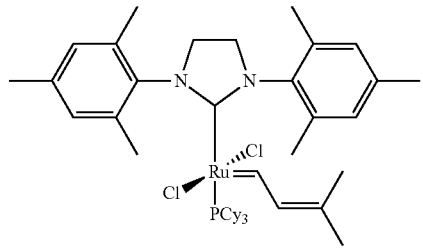
C859
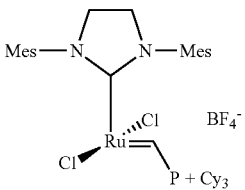
C841-n
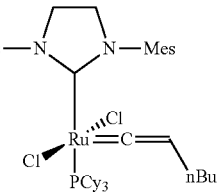
C916
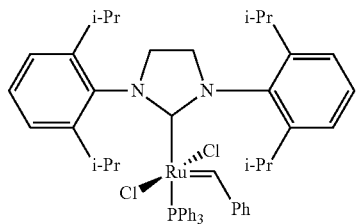
C965-p
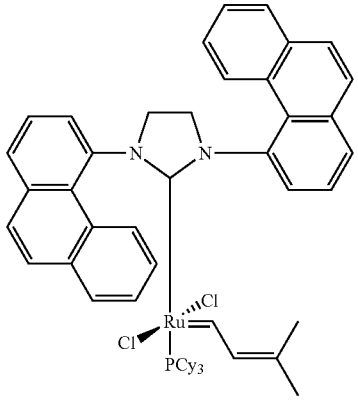
C727
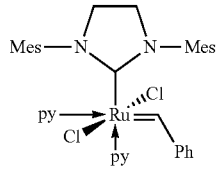

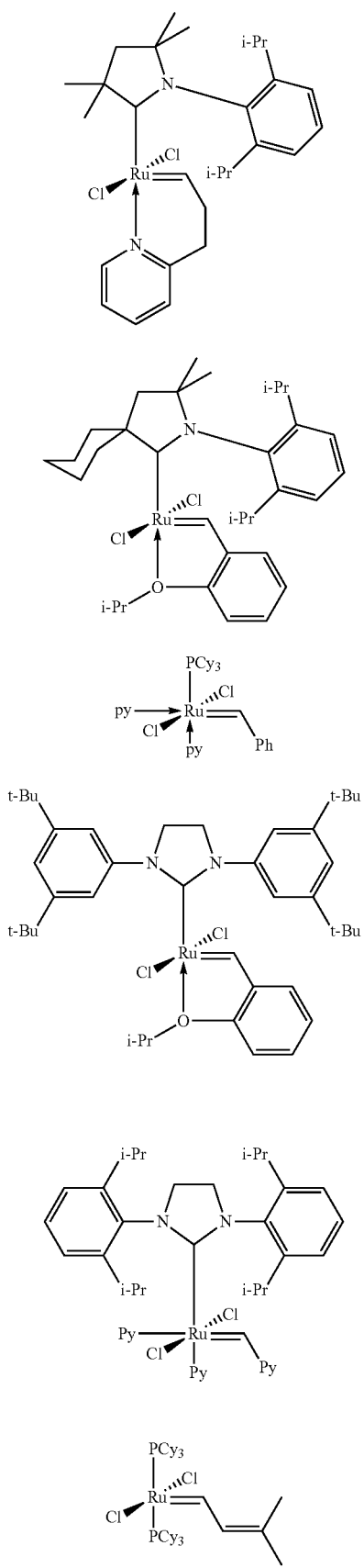
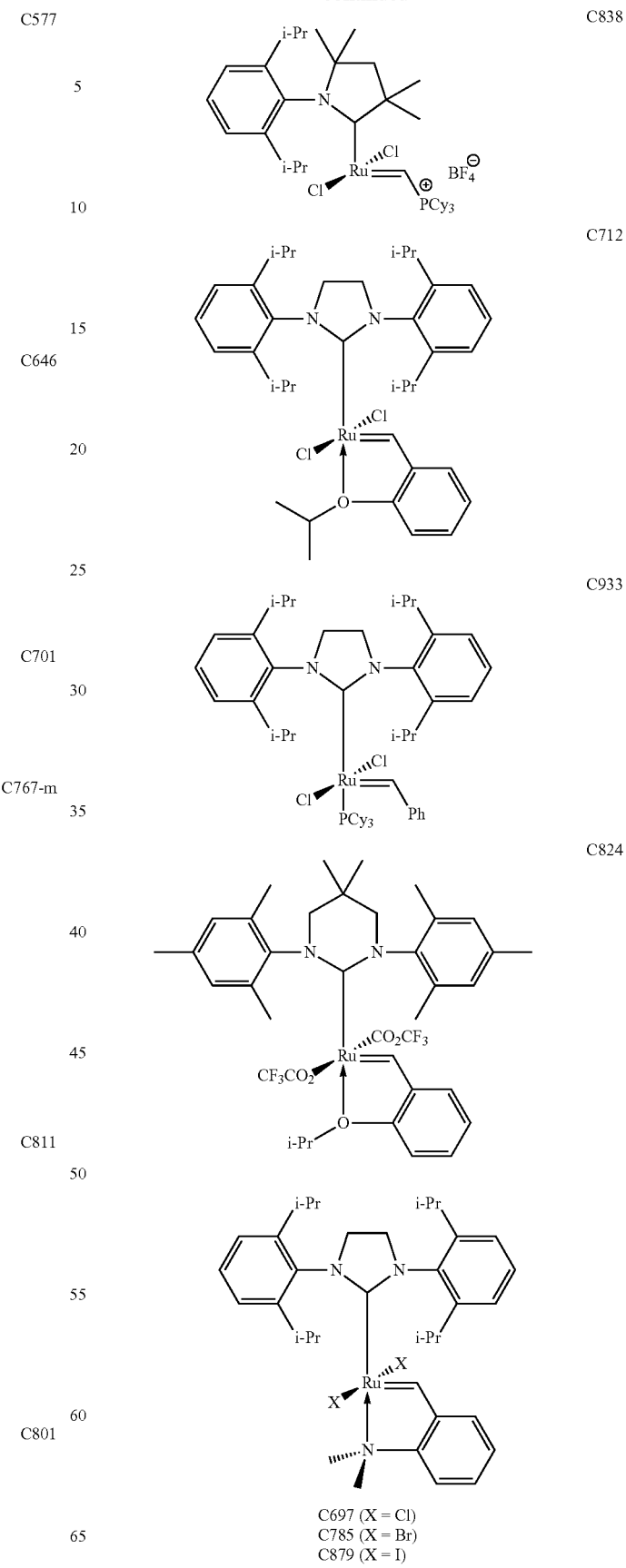

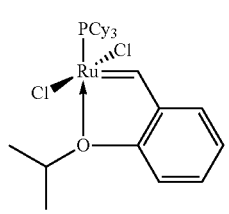
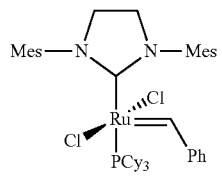
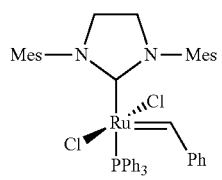
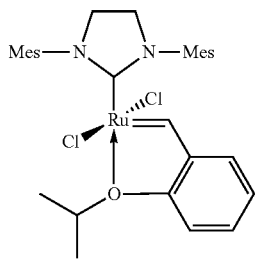
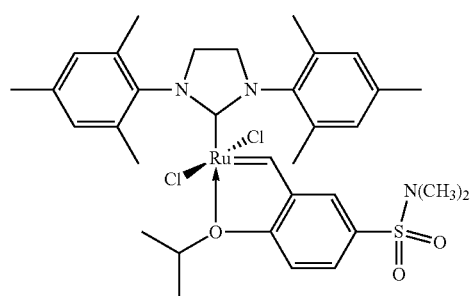
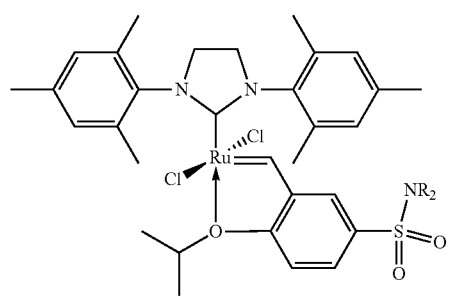
C601
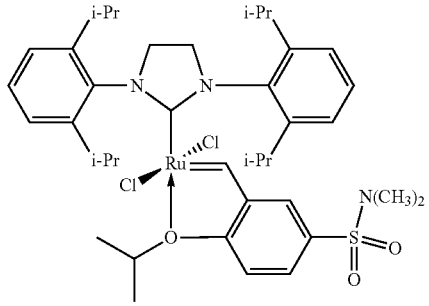
C848
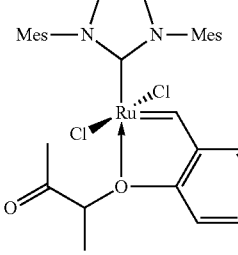
C831
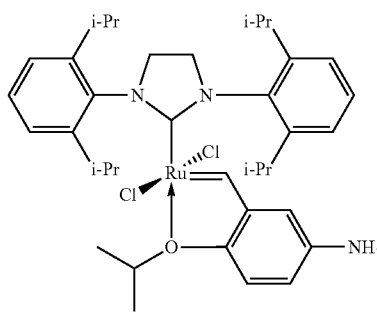
C627
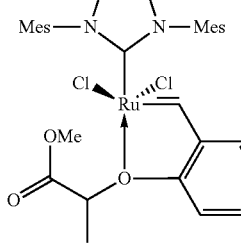
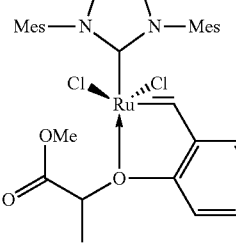
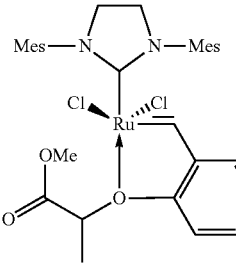

-continued

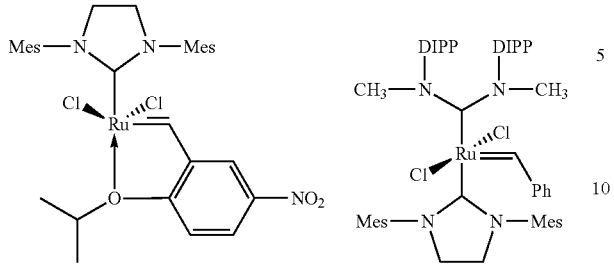

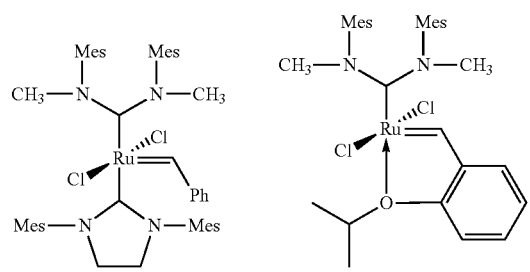

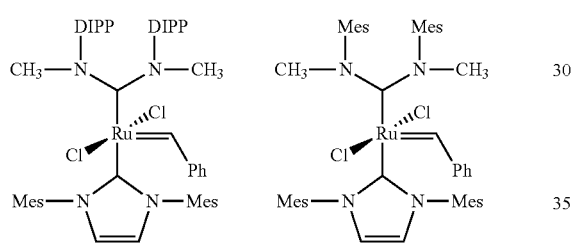

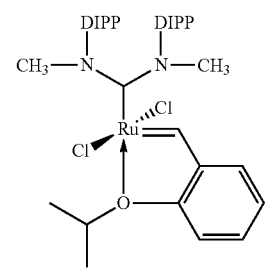

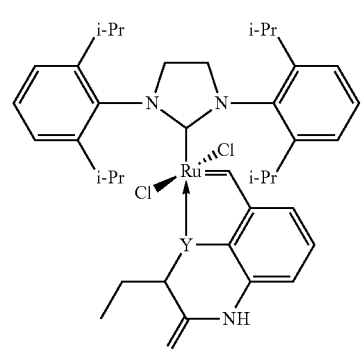

Y = O, S, NH

-continued

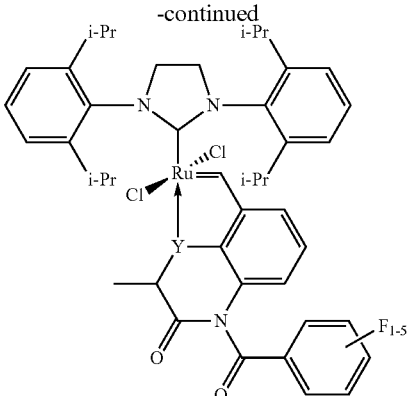

Y = O, S, NH

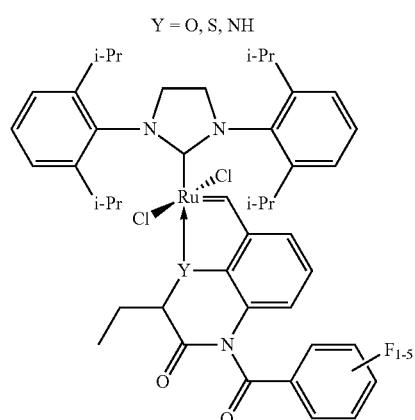

Y = O, S, NH

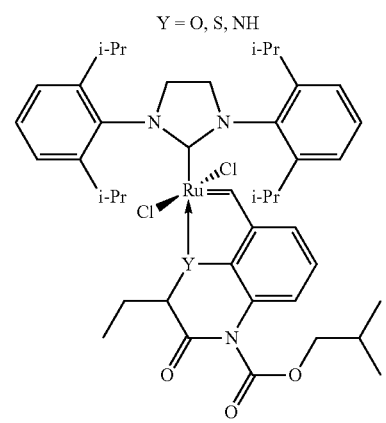

Y = O, S, NH

In the foregoing molecular structures and formulae, Ph represents phenyl, Cy represents cyclohexyl, Me represents methyl, t-Bu represents tert-butyl, Bu represents n-butyl, i-Pr represents isopropyl, py represents pyridine (coordinated through the N atom), Mes represents mesityl (i.e., 2,4,6-trimethylphenyl), DiPP and DIPP represents 2,6-diisopropylphenyl, and MiPP represents 2-isopropylphenyl.

Further examples of catalysts useful to prepare supported complexes and in the reactions disclosed herein include the following: ruthenium (II) dichloro (3-methyl-1,2-butenylidene)bis(tricyclopentylphosphine) (C716); ruthenium (II) dichloro (3-methyl-1,2-butenylidene)bis(tricyclohexylphosphine) (C801); ruthenium (II) dichloro (phenylmethylene)bis(tricyclohexylphosphine) (C823); ruthenium (II) (1,3-bis-(2,4,6-trimethylphenyl)-2-imidazolidinylidene)dichloro (phenylmethylene) (triphenylphosphine) (C830), and ruthenium (II) dichloro (phenylvinylidene)bis(tricyclohexylphosphine) (C835); ruthenium (II) dichloro (tricyclohexylphosphine) (o-isopropoxyphenylmethylene) (C601), and ruthenium (II) (1,3-bis-(2,4,6-trimethylphenyl)-2-imidazolidinylidene)dichloro (phenylmethylene)bis(3-bromopyridine (C884)).

Still further catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

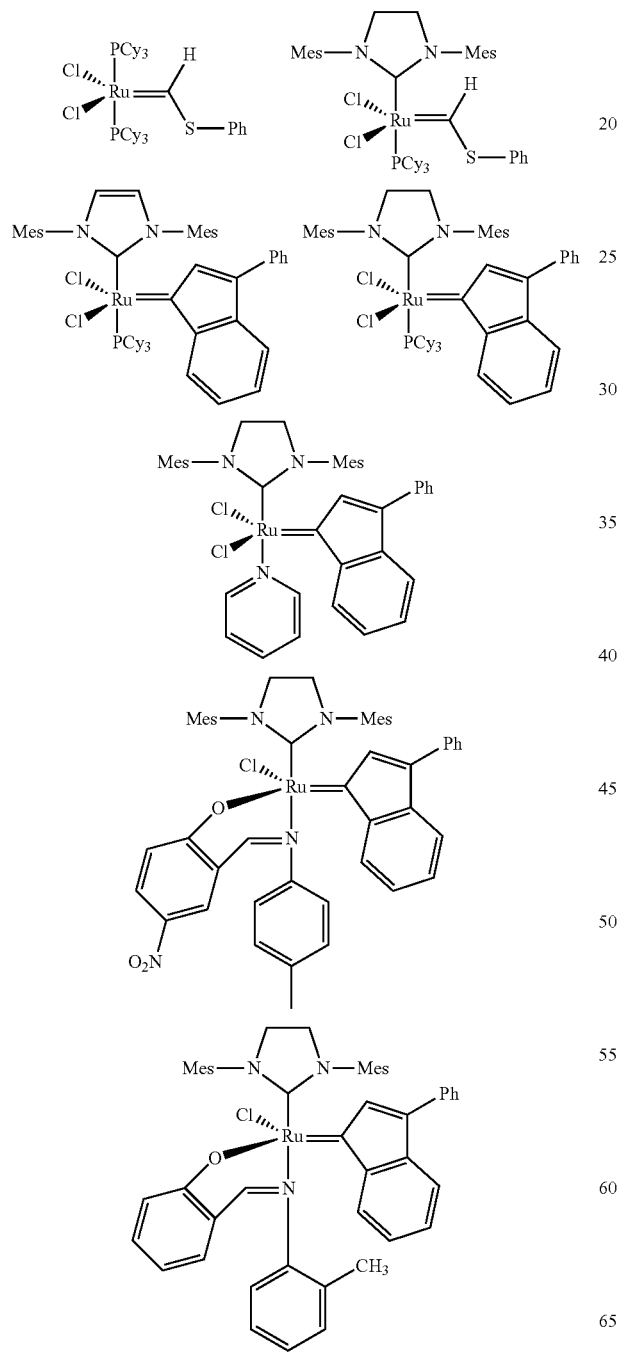

Additional, non-limiting examples of catalysts that may be used to prepare supported complexes and in the reactions disclosed herein include the following

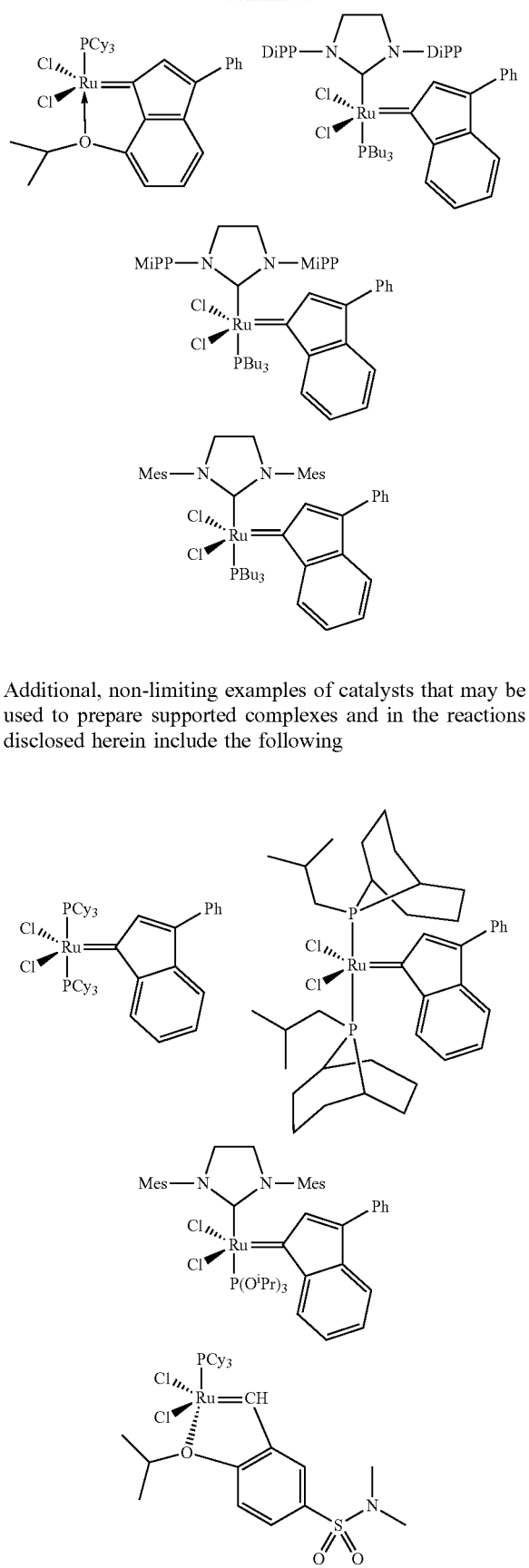

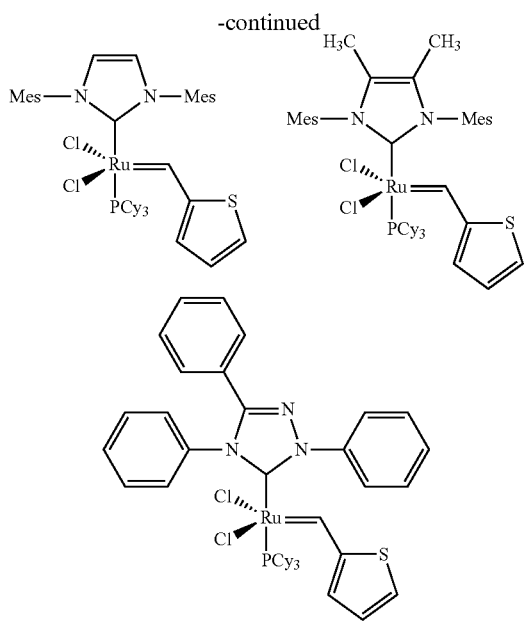

In general, the transition metal complexes used as catalysts herein can be prepared by several different methods, such as those described by Schwab et al. (1996) *J. Am. Chem. Soc.* 118:100-110, Scholl et al. (1999) *Org. Lett.* 6:953-956, Sanford et al. (2001) *J. Am. Chem. Soc.* 123: 749-750, U.S. Pat. Nos. 5,312,940, and 5,342,909, the disclosures of each of which are incorporated herein by reference. Also see U.S. Pat. Pub. No. 2003/0055262 to Grubbs et al., WO 02/079208, and U.S. Pat. No. 6,613,910 to Grubbs et al., the disclosures of each of which are incorporated herein by reference. Preferred synthetic methods are described in WO 03/11455A1 to Grubbs et al., the disclosure of which is incorporated herein by reference.

Suitable supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups.

When utilized, suitable supports may be selected from silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. The support preferably comprises silica, a silicate, or a combination thereof.

In certain embodiments, it is also possible to use a support that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of a complex linked to the support.

The metathesis catalysts that are described infra may be utilized in olefin metathesis reactions according to techniques known in the art. The catalyst is typically added to the reaction medium as a solid, or as a suspension wherein the catalyst is suspended in an appropriate liquid. It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of monomer to catalyst, the catalyst (the "monomer to catalyst ratio"), loading will generally be present in an amount that ranges from a low of about 10,000,000:1, 1,000,000:1, or 200,00:1, to a high of about 100,000:1 66,667:1, 40,000:1, 20,000:1, 10,000:1, 5,000:1, or 1,000:1.

Cyclic Olefin (Resin) Compositions and Articles

Cyclic olefin resin, particularly ROMP, compositions that may be used in the method of the invention disclosed herein generally comprise one or more cyclic olefins and an olefin metathesis catalyst. The cyclic olefins described hereinabove are suitable for use and may be functionalized or unfunctionalized, and may be substituted or unsubstituted.

Suitable resin compositions for use with this invention having a viscosity at 25° C. ranging from about 1 centipoise to about 200 centipoise (1 cp-200 cp). Viscosities typically range from 1-150 cp, 1-100 cp, 5-100 cp, 5-150 cp, 5-25 cp, 5-50 cp, 5-15 cp, 5-20 cp at 25° C. At other temperatures −20° C., −10° C., 0° C., 5° C., 15° C., 25° C., 30° C., 40° C., 50° C., 60° C. viscosities may range from 1-150 cp, 1-100 cp, 5-100 cp, 5-150 cp, 5-25 cp, 5-50 cp, 5-15 cp, 5-20 cp.

Resin compositions of the invention may be optionally formulated with additives. Suitable additives include, but are not limited to, gel modifiers, hardness modulators, antioxidants, stabilizers, fillers, binders, coupling agents, impact modifiers, thixotropes, wetting agents, biocides, plasticizers, pigments, flame retardants, dyes, fibers and reinforcement materials, including sized reinforcements and substrates, such as those treated with finishes, coatings, coupling agents, film formers and/or lubricants.

Suitable reinforcing materials include those that add to the strength or stiffness of a polymer composite when incorporated with the polymer. Reinforcing materials can be in the form of filaments, fibers, rovings, mats, weaves, fabrics, knitted material, cloth, or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra trade name), and polyoxazole fibers or fabrics (such as those produced by the Toyobo Corporation under the Zylon trade name).

Other suitable fillers include, for example, metallic density modulators, microparticulate density modulators, such as, for example, microspheres, and macroparticulate density modulators, such as, for example, glass or ceramic beads. Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like.

The invention is also directed to articles manufactured from a resin composition comprising a cyclic olefin and an olefin metathesis catalyst, such as a ROMP catalyst, using the methods of the invention. Furthermore, the compositions and articles of manufacture of the invention are not limited to a single polymer-surface interface but include also multilayers and laminates containing multiple polymer-surface interfaces. The invention is also suitable for manufacture of articles by the infusion of the resin into a porous material. Such porous materials include but are not limited to wood, cement, concrete, open-cell and reticulated foams and sponges, papers, cardboards, felts, ropes or braids of natural or synthetic fibers, and various sintered materials.

In a preferred embodiment, the metathesis reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading. The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The reactions disclosed herein may be carried out in a solvent, and any solvent that is inert towards cross-metathesis may be employed. Generally, solvents that may be used in the metathesis reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethylether, pentane, methanol, ethanol, water, or mixtures thereof. In a preferred embodiment, the reactions disclosed herein are carried out neat, i.e., without the use of a solvent.

It will be appreciated that the temperature at which a metathesis reaction according to methods disclosed herein is conducted can be adjusted as needed, and may be at least about −78° C., −40° C., −10° C., 0° C., 10° C., 20° C., 25° C., 35° C., 50° C., 70° C., 100° C., or 150° C., or the temperature may be in a range that has any of these values as the upper or lower bounds. In a preferred embodiment, the reactions are carried out at a temperature of at least about 35° C., and in another preferred embodiment, the reactions are carried out at a temperature of at least about 50° C.

EXAMPLES

Figure 7:
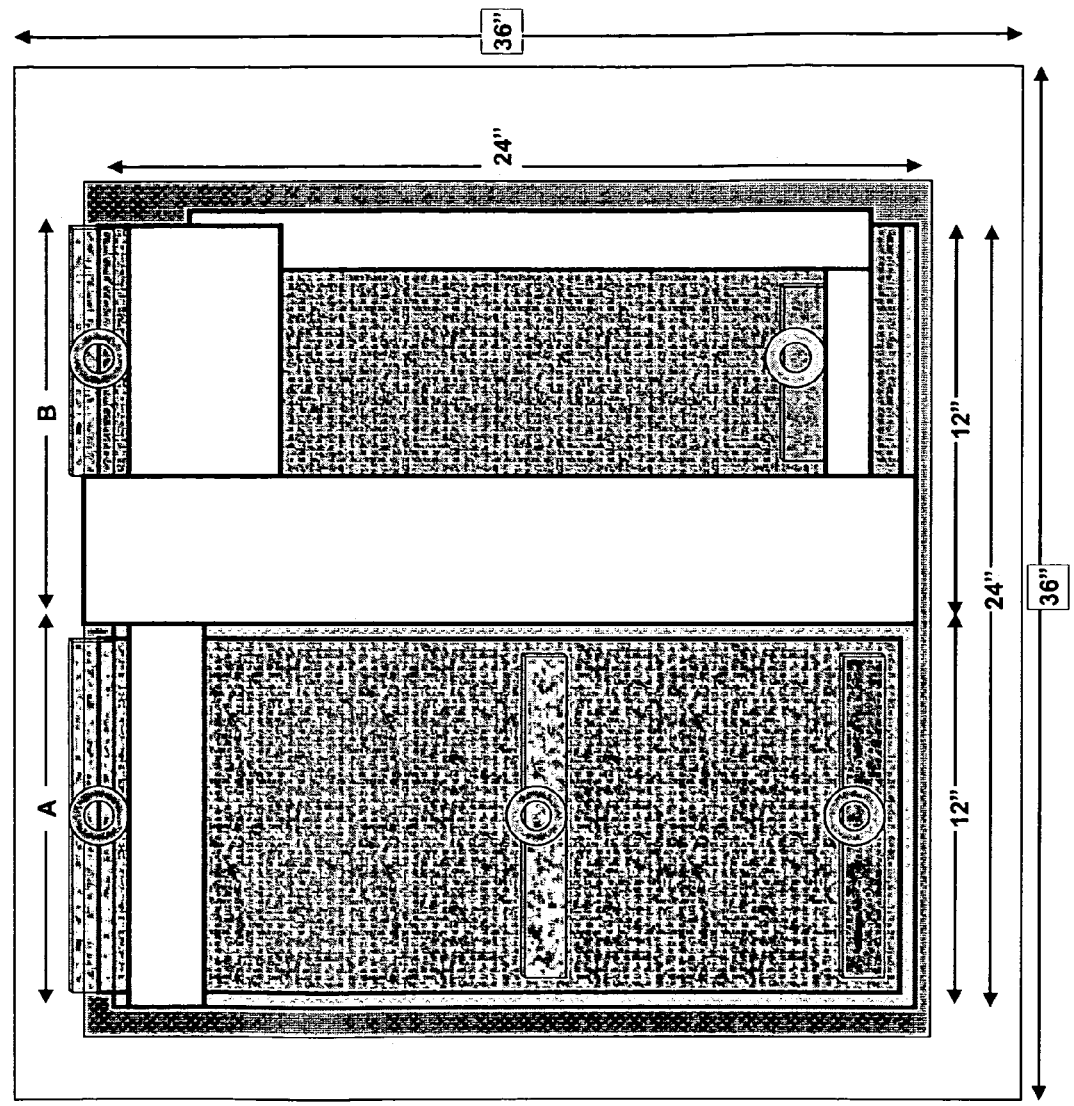
FIG. 7 depicts the top view of an exemplified VARTM infusion incorporating resin flow control structures of the invention

FIG. 7 depicts an example of a complex laminate assembly that uses a plurality of resin flow control structures with varied dimensions and positioning to control resin flow in a plurality of resin distribution media in a laminate assembly that contains a plurality of preform reinforcement layers having varied dimensions and positions.

Two zones, (A) and (B), are shown in FIG. 7 and indicate two distinct layups, which constitute one complete article. In particular, the thickness of zone (A) is greater than the thickness of zone (B). As discussed infra, besides differences in thickness, the two zones contain varied reinforcement layers, both in number, dimensions, and composition. With infusion methods as previously described in the art, a composite of the complex construction of FIG. 7, for example, contains unacceptably high void content when infused with low-viscosity resins. With high-viscosity resins, it is common to infuse zones (A) and (B) in FIG. 7 as sequential infusion and cure steps in order to control the resin flow pattern in each zone. Incorporation of resin flow control structures of the invention into the resin distribution media, allows for both zones to be infused simultaneously with low-viscosity resin (typically less than 100 cp at 40° C., for example, 1-50 cp, 5-25 cp, or 10-20 cp at 40° C.) with improved control over resin flow patterns and to minimize areas of poor resin impregnation and voids.

Figure 7A:
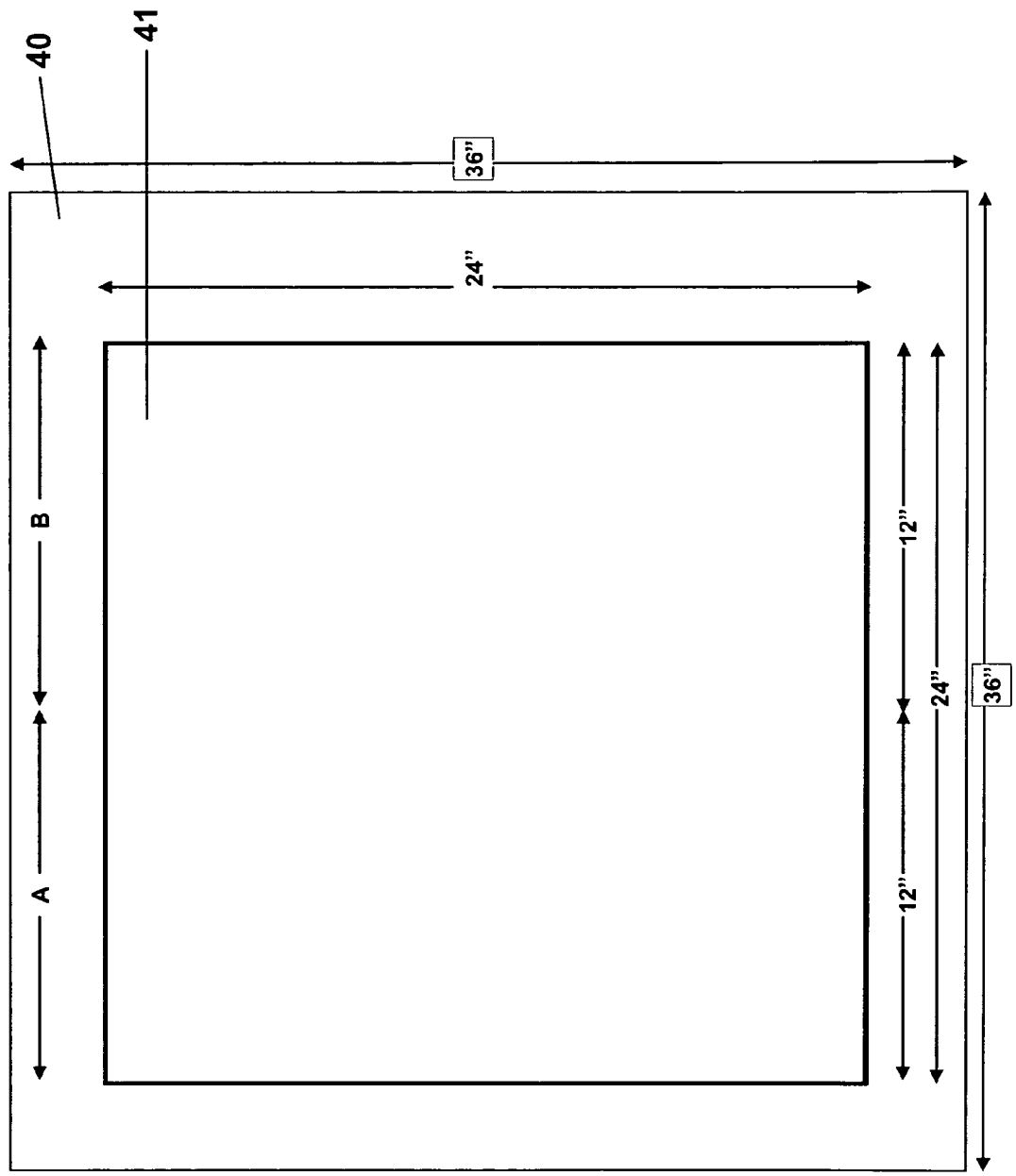
FIG. 7(a) depicts the first layer of FIG. 7.

FIG. 7(a) shows the bottom layer of FIG. 7, consisting of a sealed and release-treated mold surface made of aluminum (40) having dimensions of 36"×36". Three layers of unidirectional glass fabric reinforcement material (41) having dimensions of 24"×24", were positioned on top of the mold surface (40).

As shown in FIG. 7(b), the second layer of FIG. 7, PET core material (42), having dimensions of 8"×19", was positioned on top of the unidirectional glass fabric (41) in zone (B). Twelve layers of unidirectional glass fabric reinforcement material (43), having dimensions of 12"×24", were positioned on top of the unidirectional glass fabric reinforcement material (41) in zone (A).

As shown in FIG. 7(c), the third layer of FIG. 7, three additional layers of unidirectional glass fabric reinforcement material (44), having dimensions of 24"×24", were positioned on top of the PET core material (42) and unidirectional glass fabric reinforcement material (43) in both zones (A) and (B), thereby creating a ply drop between zones (A) and (B).

As shown in FIG. 7(d), the fourth layer of FIG. 7, a nylon peel ply (45), having dimensions of 28"×27", was positioned on top of unidirectional glass fabric reinforcement material (44).

As shown in FIG. 7(e), the fifth layer of FIG. 7, five resin flow control structures (Coremat by Lantor; 4 mm thick), having dimensions of 12"×3" (46(a)), 28"×4" (46(b)), 9"×11" (46(c)), 25"×2" (46(d)), and 8"×2" (46(e)), were positioned on top of the peel ply (45). This first layer of resin flow control structures were arranged to separate the layup into distinct resin flow zones. A 28"×4" (46(b)) resin flow control structure was arranged across the ply drop area between zones (A) and (B), extending the length of the layup, parallel to the planned resin flow direction in both zones (A) and (B). A 12"×3" (46(*a*)) resin flow control structure was arranged perpendicular to the planned resin flow in zone (A), beginning 1.5" from the desired vacuum outlet port location (60(*a*)). Zone (B) had a 9"×11" (46(*c*)) resin flow control structure arranged perpendicular to the planned resin flow in zone (B), beginning 1.5" from the desired vacuum outlet port location (60(*b*)). Zone (B) had an additional 25"×2" (46(*d*)) resin flow control structure arranged along the right-hand side of the zone, parallel to the desired resin flow. Another 8"×2" (46(*e*)) resin flow control structure was placed along the resin inlet edge of zone (B). The four sections of resin flow control structures in zone (B) substantially overlap the edges of the PET core material (42) deeper in the layup structure.

As shown in FIG. 7(*f*), the sixth layer of FIG. 7, two independent layers of resin distribution media (i.e., Enkafusion Infusion Media), having dimensions of 28"×11" (47(*a*)) and 28"×9" (47(*b*)), were positioned on top of the lay-up described in the earlier figures. No distribution media was positioned on the ply drop zone, such that there is a gap between the two resin distribution media 47(*a*) and 47(*b*).

As shown in FIG. 7(*g*), the seventh layer of FIG. 7, a second layer of five resin flow control structures (Coremat by Lantor; 4 mm thick), having dimensions of 12"×3" (48(*a*)), 28"×4" (48(*b*)), 9"×11" (48(*c*)), 25"×2" (48(*d*)), and 8"×2" (48(*e*)), were positioned on top of the resin distribution media (47(*a*) and 47(*b*)) such that the second layer of resin flow control structures (48(*a*)-(*e*)) substantially overlay the corresponding first layer of resin flow control structures having the same dimensions beneath them (i.e., 46(*a*)-(*e*)).

As shown in FIG. 7(*h*), the eighth layer of FIG. 7, two additional independent layers of resin distribution media (i.e., Enkafusion Infusion Media), having dimensions of 28"×11" (49(*a*)) and 28"×9" (49(*b*)), were positioned on top of the lay-up described in the earlier figures. No distribution media was positioned on the ply drop zone, such that there is a gap between the two resin distribution media 49(*a*) and 49(*b*).

As shown in FIG. 7(*i*), the ninth layer of FIG. 7, a third layer of five resin flow control structures (Coremat by Lantor; 4 mm thick), having dimensions of 12"×3" (50(*a*)), 28"×4" (50(*b*)), 9"×11" (50(*c*)), 25"×2" (50(*d*)), and 8"×2" (50(*e*)), were positioned on top of the resin distribution media (49(*a*) and 49(*b*)) such that the third layer of resin flow control structures (50(*a*)-(*e*)) substantially overlay the corresponding first and second layers of resin flow control structures having the same dimensions beneath them (i.e., 48(*a*)-(*e*) and 46(*a*)-(*e*)).

As shown in FIG. 7(*j*), the tenth layer of FIG. 7, Colbond Enkachannels (51) was positioned on top of the second layer of resin distribution media (49(*a*) and 49(*b*)). A vacuum bag (52) was placed over the completed layup. Inlet ports (61(*a*) and 61(*c*) in zone (A) and 61(*b*) in zone (B)) and outlet ports (60(*a*) for zone (A) and 60(*b*) and zone (B)) were installed through the vacuum bag and positioned on top of the Colbond Enkachannels (51). The vacuum bag was affixed to the mold surface (40) using a sealant (i.e., Airtech AT® 200 Yellow tape) and vacuum was applied at 60(*a*) and 60(*b*) to evacuate air from the layup.

Viscosity Measurements: Uncatalyzed resin samples (100 g) were equilibrated to 25° C. and viscosities were measured with a Brookfield DV-II Viscometer (spindle S62 at 150 rpm).

Example 1

A low-viscosity (10-15 centipoise at 25° C.) mixture of resin containing dicyclopentadiene (containing 20-25% tricyclopentadiene), 2 phr Ethanox® 4702 and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the layup (as shown in FIG. 7 and described in FIGS. 7*a*-7*j*) through inlet ports 61*a*-61(*c*). After the preform was determined to be fully impregnated with resin, the resin was cured to form a composite laminate. Visual inspection confirmed the lack of any voids or areas of low resin impregnation in the composite laminate.

Example 2

This Example used a modification of the layup shown in FIG. 7 and described in FIGS. 7*a*-7*j*. In this example, the resin distribution media (i.e. Enkafusion Infusion Media) in Zone (A) (47(*a*) & 49(*a*)) had dimensions 24"×11" so that the end of the resin distribution media stopped 4" short of the end of the complex laminate near the outlet port 60(*a*) located in Zone (A). Furthermore, a separate 2"×11" piece of resin distribution media was placed at the end of the complex laminate in Zone (A) near the outlet port to create a physical gap (2"×11") between the resin distribution media (47(*a*) & 49(*a*)) having dimensions 24"×11" and the 2"×11" piece of resin distribution media placed at the end of the complex laminate in Zone (A). Also in this example the resin distribution media in Zone (B) (49(*a*) & 49(*b*)) had dimensions 21"×7" so that the end of the resin distribution media stopped 7" short of the end of the complex laminate in Zone (B). Furthermore, separate 2"×7" piece of resin distribution media was placed at the end of the complex laminate in Zone (B) to create a physical gap (5"×7") between the resin distribution media (47(*b*) & 49(*b*)) having dimensions 21"×7" and the 2"×7" piece of resin distribution media placed at the end of the complex laminate. Additionally, the modified layup of this example did not contain an outlet port 60(*b*) in Zone (B). Additionally, the modified layup in this example did not contain flow control structures 46(*a*)-46(*e*), 48(*a*)-46(*e*), or 50(*a*)-50(*e*)). The remainder of the components comprising the layup, as shown in FIG. 7 and described in FIGS. 7*a*-7*j* were present in the modified layup used in this example. A low-viscosity (10-15 centipoise at 25° C.) mixture of resin containing dicyclopentadiene (containing 20-25% tricyclopentadiene), 2 phr Ethanox® 4702 and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the modified layup of this example through inlet ports 61(*a*)-61(*c*). Resin reached outlet port 60(*a*) without full impregnation of the preform. The resin was cured to form a composite laminate, and visual inspection confirmed significant void regions and areas of low resin impregnation in the composite laminate.

Example 3

A moderate-viscosity (150 centipoise at 25° C.) resin was created by dissolution of styrene/ethylene/butylene (SEBS) thermoplastic block copolymer (2 phr) in dicyclopentadiene (containing 20-25% tricyclopentadiene) and 2 phr Ethanox® 4702. A mixture of the resin and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the layup (as shown in FIG. 7 and described in FIGS. 7a-7j) through inlet ports 61(a)-61(c). After the preform was determined to be fully impregnated with resin, the resin was cured to form a composite laminate. Visual inspection confirmed the lack of any voids or areas of low resin impregnation in the composite laminate.

Example 4

This Example used a modification of the layup shown in FIG. 7 and described in FIGS. 7a-7j. The modified layup in this example did not contain flow control structures 46(a)-46(e), 48(a)-46(e), or 50(a)-50(e)). The remainder of the components comprising the layup, as shown in FIG. 7 and described in FIGS. 7a-7j were present in the modified layup used in this example. A moderate-viscosity (150 centipoise at 25° C.) resin was created by dissolution of styrene/ethylene/butylene (SEBS) thermoplastic block copolymer (2 phr) in dicyclopentadiene (containing 20-25% tricyclopentadiene) and 2 phr Ethanox® 4702. A mixture of the resin and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the layup (as shown in FIG. 7 and described in FIGS. 7a-7j) through inlet ports 61(a)-61(c). Resin reached outlet ports 60(a)-60(b) without full impregnation of the preform. The resin was cured to form a composite laminate, and visual inspection confirmed significant void regions and areas of low resin impregnation in the composite laminate.

Example 5

A moderate-viscosity (300 centipoise at 25° C.) resin was created by dissolution of styrene/ethylene/butylene (SEBS) thermoplastic block copolymer (3.5-4.0 phr) in dicyclopentadiene (containing 20-25% tricyclopentadiene) and 2 phr Ethanox® 4702. A mixture of the resin and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the layup (as shown in FIG. 7 and described in FIGS. 7a-7j) through inlet ports 61(a)-61(c). After the preform was determined to be fully impregnated with resin, the resin was cured to form a composite laminate. Visual inspection confirmed the lack of any voids or areas of low resin impregnation in the composite laminate.

Example 6

Figure 8:
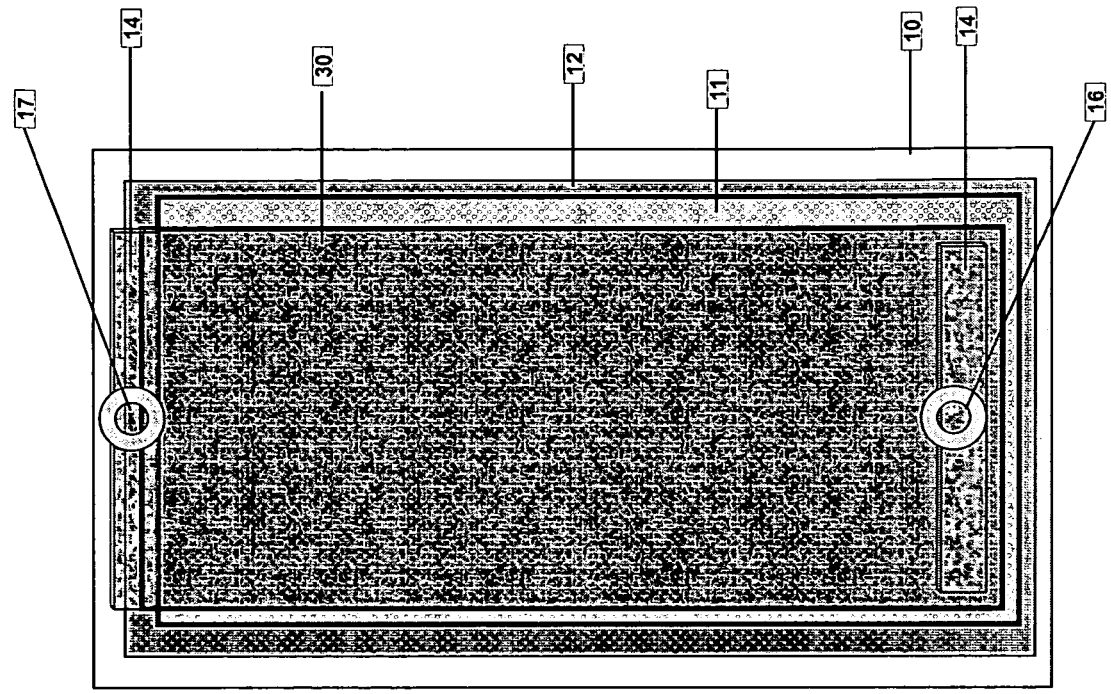
FIG. 8 depicts a top-view of a VARTM infusion.

The composite laminate of this example was constructed as follows (FIG. 8). The bottom layer of the composite laminate consisted of a sealed and release-treated mold surface (10) made of aluminum having dimensions 36"×36". Thirty-eight layers of unidirectional glass fabric reinforcement material (11) having dimensions 25"×25" were positioned on top of the mold surface (10). A peel ply (12) having dimensions 33"×27.5" was positioned on top of the unidirectional glass fabric reinforcement material (11). Resin distribution media (30) (i.e. Enkafusion Infusion Media) having dimensions 32"×24" was placed on top of the peel ply (12). Secondary resin distribution media (14) (i.e. ¼" coil) were positioned on top of the resin distribution media (30) at opposite ends of the composite laminate corresponding to the position of the inlet port (16) and outlet port (17). A vacuum bag (not shown) was placed over the completed layup. An inlet port (16) and outlet port (17) were installed through the vacuum bag (not shown) and positioned on top of the respective secondary resin distribution media (14). The vacuum bag (not shown) was affixed to the mold surface using sealant (i.e. Airtech AT® Yellow tape) and the vacuum was applied to the outlet port (17) to evacuate air from the layup. A low-viscosity (10-15 centipoise at 25° C.) mixture of resin containing dicyclopentadiene (containing 20-25% tricyclopentadiene), 2 phr Ethanox® 4702 and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the layup at the inlet port (16). Resin reached outlet port (17) without full impregnation of the preform. The resin was cured to form a composite laminate, and visual inspection confirmed significant void regions and areas of low resin impregnation in the composite laminate.

Example 7

Figure 9:
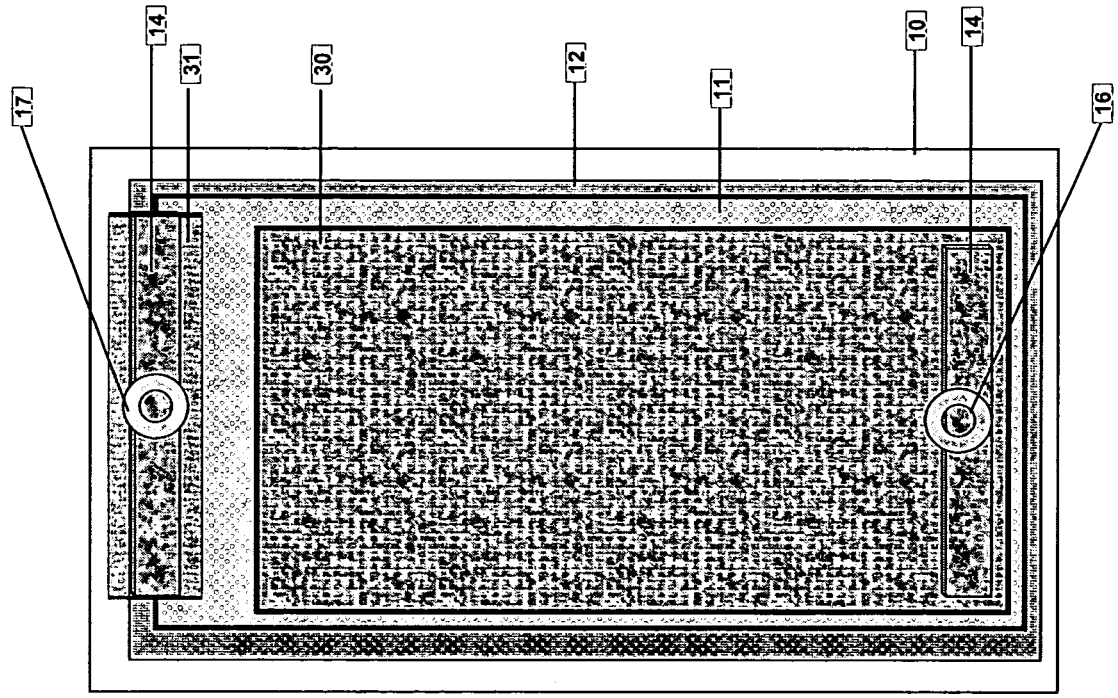
FIG. 9 depicts a top-view of a VARTM infusion.

The composite laminate of this example was constructed as follows (FIG. 9). The bottom layer of the composite laminate consisted of a sealed and release-treated mold surface (10) made of aluminum having dimensions 36"×36". Thirty-eight layers of unidirectional glass fabric reinforcement material (11) having dimensions 25"×25" were positioned on top of the mold surface (10). A peel ply (12) having dimensions 33"×27.5" was positioned on top of the unidirectional glass fabric reinforcement material (11). A first piece of resin distribution media (30) (i.e. Enkafusion Infusion Media), having dimensions 25"×24" was placed on top of the peel ply (12) so that one end of the resin distribution media (30) was positioned near one end of the composite laminate and the inlet port (16). A second piece of resin distribution media (31) (i.e. Enkafusion Infusion Media) having dimensions 3.75"×24" was placed on top of the peel ply (12) so that one end of the resin distribution media (31) was positioned near the opposite end of the composite laminate and the outlet port (17). The second piece of resin distribution media (31) was placed so as to create a physical gap (2"×24") between the first piece of resin distribution media (30) and second piece of resin distribution media (31). Secondary resin distribution media (14) (i.e. ¼" coil) were positioned on top of the resin distribution media (30,31) at opposite ends of the composite laminate corresponding to the position of the inlet port (16) and outlet port (17). A vacuum bag (not shown) was placed over the completed layup. An inlet port (16) and an outlet port (17) were installed through the vacuum bag (not shown) and positioned on top of the respective secondary resin distribution media (14). The vacuum bag (not shown) was affixed to the mold surface using sealant (i.e. Airtech AT® 200 Yellow tape) and the vacuum was applied to the outlet port (17) to evacuate air from the layup. A low-viscosity (10-15 centipoise at 25° C.) mixture of resin containing dicyclopentadiene (containing 20-25% tricyclopentadiene), 2 phr Ethanox® 4702 and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the layup at the inlet port (16). After the preform was determined to be fully impregnated with resin, the resin was cured to form a composite laminate. Visual inspection confirmed the lack of any voids or areas of low resin impregnation in the composite laminate.

Example 8

Figure 10:
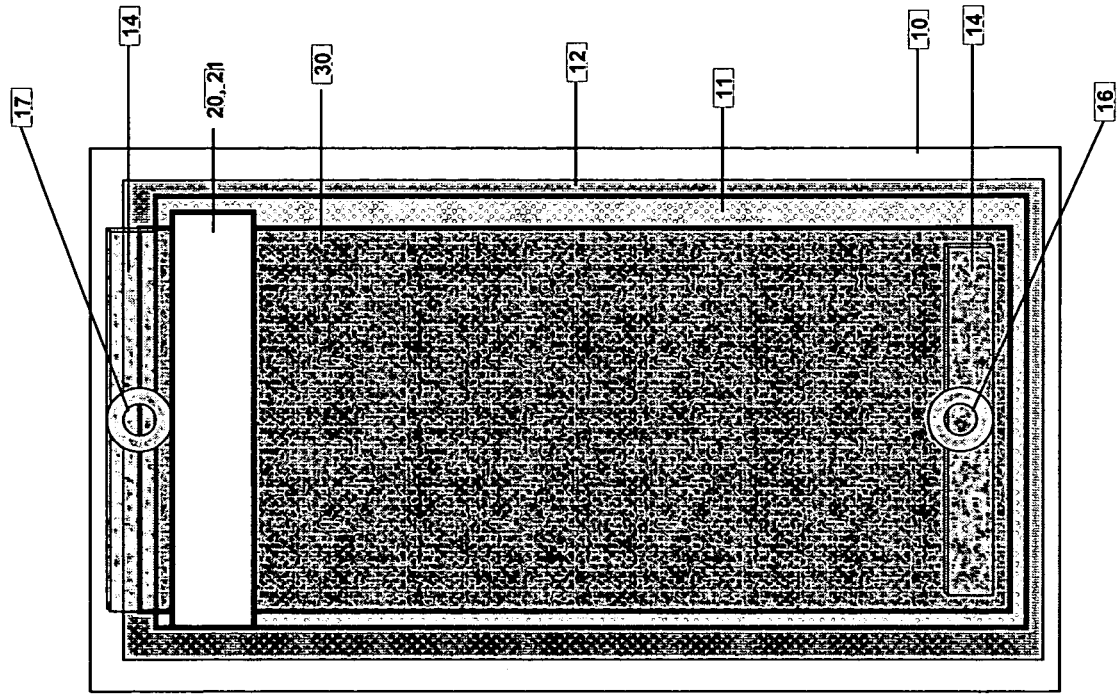
FIG. 10 depicts a top-view of a VARTM infusion.

The composite laminate of this example was constructed as follows (FIG. 10). The bottom layer of the composite laminate consisted of a sealed and release-treated mold surface (10) made of aluminum having dimensions 36"×36". Thirty-eight layers of unidirectional glass fabric reinforcement material (11) having dimensions 25"×25" were positioned on top of the mold surface (10). A peel ply (12) having dimensions 33"×27.5" was positioned on top of the unidirectional glass fabric reinforcement material (11). Resin distribution media (30) (i.e. Enkafusion Infusion Media) having dimensions 32"×24" was placed on top of the peel ply (12). Resin flow control structures (20,21) (Coremat by Lantor; 4 mm thick) having dimensions 24.5"×2.25" were placed on the top and bottom surfaces of the resin distribution media (30). Secondary resin distribution media (14) (i.e. ¼" coil) were positioned on top of the resin distribution media (30) at opposite ends of the composite laminate corresponding to the position of the inlet port (16) and outlet port (17). A vacuum bag (not shown) was placed over the completed layup. An inlet port (16) and outlet port (17) were installed through the vacuum bag (not shown) and positioned on top of the respective secondary resin distribution media (14). The vacuum bag (not shown) was affixed to the mold surface using sealant (i.e. Airtech AT® Yellow tape) and the vacuum was applied to the outlet port (17) to evacuate air from the layup. A low-viscosity (10-15 centipoise at 25° C.) mixture of resin containing dicyclopentadiene (containing 20-25% tricyclopentadiene), 2 phr Ethanox® 4702 and ruthenium catalyst [1,3-bis-(2,4,6-trimethylphenyl)-2-imidazolidinylidene]dichloro(3-methyl-2-butenylidene)(tricyclohexylphosphine) ruthenium (II) (C827, available from Materia, Inc.) (monomer to catalyst ratio 30,000:1) suspended in paraffin oil was introduced into the layup at the inlet port (16). After the preform was determined to be fully impregnated with resin, the resin was cured to form a composite laminate. Visual inspection confirmed the lack of any voids or areas of low resin impregnation in the composite laminate.

It is to be understood that while the invention has been described in conjunction with specific embodiments thereof, the description above as well as the examples that follow are intended to illustrate and not limit the scope of the invention. Other aspects and modifications within the scope of the invention will be apparent to those skilled in the art to which the invention pertains. The contents of all patents and patent applications cited in this disclosure are incorporated herein by reference.

What is claimed is:

1. A vacuum-assisted resin transfer molding method, the method comprising:
providing a vacuum-assisted resin transfer mold assembly comprising a mold having a first mold surface and a second mold surface arranged to enclose a laminate assembly within a space between the first and second mold surfaces when the laminate assembly is placed on the first mold surface;
providing a laminate assembly comprising a laminate pre-form, a peel ply, and a resin distribution media pervious to the flow of a resin, the laminate pre-form having first and second surfaces, the first surface of the pre-form positioned to be in contact with the first mold surface, the peel ply positioned such that the second surface of the laminate pre-form is in contact with the peel ply, and the resin distribution media positioned to be contained within the first and second mold surfaces;
positioning at least one resin flow control structure to modify the flow of resin within the resin distribution media;
providing at least one inlet and at least one outlet in the laminate assembly such that the resin can be introduced into the assembly through the inlet;
arranging and sealing the second mold surface to enclose the laminate assembly within the space between the first and second mold surfaces such that a vacuum can be pulled on the laminate assembly contained within the space between the first and second mold surfaces;
applying a vacuum to the mold assembly;
allowing the resin to flow into the laminate assembly through the at least one inlet such that the resin flows into the resin distribution media;
allowing the resin to flow out of the laminate assembly through the at least one outlet; and
allowing the resin to cure in the laminate assembly to form a laminate material, wherein said at least one resin flow control structure is a bulking material.

2. The vacuum-assisted resin transfer molding method of claim 1, wherein said second mold surface is a vacuum bag.

3. The vacuum-assisted resin transfer molding method of claim 1, wherein said at least one resin flow control structure contacts the resin distribution media.

4. The vacuum-assisted resin transfer molding method of claim 1, wherein said at least one resin flow control structure reduces lead-lag in the laminate pre-form.

5. The vacuum-assisted resin transfer molding method of claim 1, wherein said at least one resin flow control structure decreases the flow rate of the resin in the resin distribution media.

6. The vacuum-assisted resin transfer molding method of claim 1, wherein said at least one resin flow control structure modifies the direction of the resin flow.

7. The vacuum-assisted resin transfer molding method of claim 1, wherein said at least one resin flow control structure is gas-permeable.

8. The vacuum-assisted resin transfer molding method of claim 1, wherein said at least one resin flow control structure is at least twice as thick as the thickness of the resin distribution media.

9. The vacuum-assisted resin transfer molding method of claim 1, wherein said at least one resin flow control structure includes at least two resin flow control structures, and wherein the at least two resin flow control structures substantially overlay each other.

10. The vacuum-assisted resin transfer molding method of claim 1, wherein said at least one resin flow control structure overlaps the resin distribution media.

11. The vacuum-assisted resin transfer molding method of claim 1, wherein the resin has a viscosity less than 100 centipoise.

12. The vacuum-assisted resin transfer molding method of claim 1, wherein the resin comprises a cyclic olefin selected from strained cyclic olefins, unstrained cyclic olefins, acyclic olefins, dienes, and unsaturated polymers, or combinations thereof, wherein the cyclic olefin may contain a functional group, or be substituted with a group, selected from halogen, hydroxyl, hydrocarbyl, alkoxy, alkenyloxy, alkynyloxy, aryloxy, aralkyloxy, alkaryloxy, acyl, acyloxy, alkoxycarbonyl, alkylcarbonato, arylcarbonato, carboxy, carboxylato, carbamoyl, alkyl-substituted carbamoyl, haloalkyl-substituted carbamoyl, aryl-substituted carbamoyl, thiocarbamoyl, alkyl-substituted thiocarbamoyl, aryl-substituted thiocarbamoyl, carbamido, cyano, cyanato, thiocyanato, formyl, thioformyl, amino, alkyl-substituted amino, aryl-substituted amino, alkylamido, arylamido, imino, alkylimino, arylimino, nitro, nitroso, sulfo, sulfonato, alkylsulfanyl, arylsulfanyl, alkylsulfinyl, arylsulfinyl, alkyl sulfonyl, alkylaminosulfonyl, arylsulfonyl, boryl, borono, boronato, phosphono, phosphonato, phosphinato, phospho, phosphino, or a combination thereof.

13. The vacuum-assisted resin transfer molding method of claim 12, wherein the cyclic olefin is selected from cyclobutene, cycloheptene, cyclooctene, cyclononene, cyclodecene, cyclooctadiene, cyclononadiene, cyclododecatriene, norbornene, dicyclopentadiene, tricyclopentadiene, tetracyclododecene, tetracyclododecadiene, substituted norbornenes, substituted dicyclopentadienes, or combinations thereof.

14. The vacuum-assisted resin transfer molding method of claim 1, wherein the resin comprises a catalyst selected from a Group 8 transition metal complex having the structure

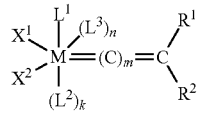

wherein,
M is a Group 8 transition metal;
$L^1$ $L^2$ and $L^3$ are independently selected from neutral electron donor ligands;
n is 0 or 1, such that $L^3$ may or may not be present;
m is 0, 1, or 2;
k is 0 or 1;
$X^1$ and $X^2$ are independently selected from anionic ligands; and
$R^1$ and $R^2$ and le are independently selected from hydrogen, hydrocarbyl, substituted hydrocarbyl, heteroatom-containing hydrocarbyl, substituted heteroatom-containing hydrocarbyl, and functional groups; wherein one or both of $R^1$ and $R^2$ may have the structure $-(W)_n-U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$ $L^2$, $L^3$, $R^1$, and $R^2$ may be attached to a support.

15. The vacuum-assisted resin transfer molding method of claim 14, wherein the catalyst has the structure

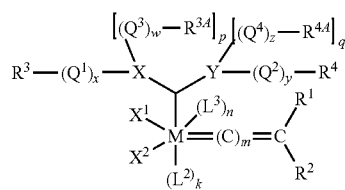

wherein,
M is a Group 8 transition metal;
n is zero or 1;
m is 0, 1, or 2;
k is 0 or 1;
$X^1$ and $X^2$ are independently selected from anionic ligands;
$L^2$ and $L^3$ are independently selected from neutral electron donor ligands, or may be taken together to form a single bidentate neutral electron-donating ligand;
$R^1$ and $R^2$ are independently selected from hydrogen, hydrocarbyl, substituted hydrocarbyl, heteroatom-containing hydrocarbyl, substituted heteroatom-containing hydrocarbyl, and functional groups, or may be taken together to form an indenylidene moiety;
X and Y are independently selected from C, N, O, S, and P;
p is zero when X is O or S, and p is 1 when X is N or P;
q is zero when Y is O or S, and q is 1 when Y is N or P;
$Q^1$, $Q^2$, $Q^3$, and $Q^4$ are independently selected from hydrocarbylene, substituted hydrocarbylene, heteroatom-containing hydrocarbylene, substituted heteroatom-containing hydrocarbylene, and —(CO)—, and further wherein two or more substituents on adjacent atoms within Q may be linked to form an additional cyclic group;
w, x, y, and z are independently zero or 1; and
$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl,
wherein any two or more of $X^1$, $X^2$, $L^2$, $L^3$, $R^1$, $R^2$, $Q^1$, $Q^2$, $Q^3$, $Q^4$, $R^3$, $R^{3A}$, $R^4$, and $R^{4A}$ can be taken together to form a cyclic group, and further wherein any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support.

16. The vacuum-assisted resin transfer molding method of claim 15, wherein M is ruthenium, w, x, y, and z are zero, X and Y are N, and $R^{3A}$ and $R^{4A}$ are linked to form -Q-, such that the complex has the structure

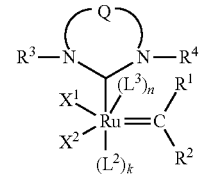

wherein Q is a hydrocarbylene, substituted hydrocarbylene, heteroatom-containing hydrocarbylene, or substituted heteroatom-containing hydrocarbylene linker, and further wherein two or more substituents on adjacent atoms within Q may be linked to form an additional cyclic group.

17. The vacuum-assisted resin transfer molding method of claim 16, wherein:
Q is $-CR^{11}R^{12}-CR^{13}R^{14}-$ wherein $R^{11}$, $R^{12}$, $R^{13}$, and $R^{14}$ are independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl; and
$R^3$ and $R^4$ are unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide.

18. The vacuum-assisted resin transfer molding method of claim 16, wherein:

$X^1$ and $X^2$ are halide;

Q is —$CR^{11}R^{12}$—$CR^{13}R^{14}$— or —$CR^{11}$=$CR^{13}$ -, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups, or wherein any two of $R^{11}$, $R^{12}$, $R^{13}$, and $R^{14}$ may be linked together to form a substituted or unsubstituted, saturated or unsaturated ring; and $R^3$ and $R^4$ are aromatic.

19. The vacuum-assisted resin transfer molding method of claim 18, wherein:

Q is —$CR^{11}R^{12}$—$CR^{13}R^{14}$— wherein $R^{11}$, $R^{12}$, $R^{13}$, and $R^{14}$ are independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl; and $R^3$ and $R^4$ are unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide.

20. The vacuum-assisted resin transfer molding method of claim 14, wherein at least one of $L^1$, $L^2$, and $L^3$ is an N-heterocyclic carbene ligand.

21. The vacuum-assisted resin transfer molding method of claim 20, wherein the N-heterocyclic carbene ligand has the structure

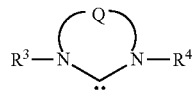

wherein,

Q is —$CR^{11}R^{12}$—$CR^{13}R^{14}$— or —$CR^{11}$=$CR^{13}$ —, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups, or wherein any two of $R^{11}$, $R^{12}$, $R^{13}$, and $R^{14}$ may be linked together to form a substituted or unsubstituted, saturated or unsaturated ring; and $R^3$ and $R^4$ are unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide.

22. The vacuum-assisted resin transfer molding method of claim 1, wherein the resin comprises a catalyst comprising a chelating alkylidene ligand.

23. The vacuum-assisted resin transfer molding method of claim 22, wherein the catalyst has the structure

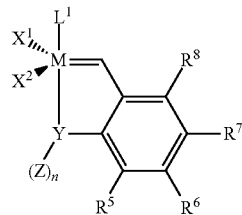

wherein,

M is a Group 8 transition metal;

$X^1$ and $X^2$ are independently selected from anionic ligands;

$L^1$ is selected from neutral electron donor ligands;

Y is a heteroatom selected from N, O, S, and P;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkyl sulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein A is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group;

and any combination of $R^5$, $R^6$, $R^7$, and $R^8$ can be linked to form one or more cyclic groups;

n is 1 or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, thioisocyanate, cyanato, thiocyanato, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support.

* * * * *